United States Patent [19]
Makita et al.

[11] Patent Number: 5,920,655
[45] Date of Patent: Jul. 6, 1999

[54] BINARIZATION IMAGE PROCESSING FOR MULTI-LEVEL IMAGE DATA

[75] Inventors: Takeshi Makita, Kawasaki; Osamu Yamada; Hiroshi Mori, both of Yokohama, all of Japan

[73] Assignee: Canon Kabushiki Kaisha, Tokyo, Japan

[21] Appl. No.: 08/597,871

[22] Filed: Feb. 7, 1996

[30] Foreign Application Priority Data

| Feb. 10, 1995 | [JP] | Japan | 7-022895 |
| Feb. 10, 1995 | [JP] | Japan | 7-022899 |
| Feb. 10, 1995 | [JP] | Japan | 7-022900 |

[51] Int. Cl.⁶ .................................................. G06K 9/36
[52] U.S. Cl. .................................... 382/272; 382/270
[58] Field of Search .................................. 382/270–273, 382/172, 169; 358/465–466

[56] References Cited

U.S. PATENT DOCUMENTS

| 4,701,807 | 10/1987 | Ogino | 358/284 |
| 4,918,543 | 4/1990 | Petilli | 358/465 |
| 5,091,963 | 2/1992 | Litt et al. | 382/8 |
| 5,097,520 | 3/1992 | Bessho et al. | 382/51 |
| 5,130,819 | 7/1992 | Ohta | 358/445 |
| 5,251,046 | 10/1993 | Kato et al. | 358/457 |
| 5,363,219 | 11/1994 | Yoshida | 358/539 |
| 5,452,107 | 9/1995 | Koike | 358/468 |

FOREIGN PATENT DOCUMENTS

| 349234A2 | 1/1990 | European Pat. Off. . |
| 4409389A1 | 9/1994 | Germany . |
| 60-66575 | 4/1985 | Japan . |
| 63-211974 | 9/1988 | Japan . |
| 4-282780 | 10/1992 | Japan . |

*Primary Examiner*—David K. Moore
*Assistant Examiner*—Stephen Brinich
*Attorney, Agent, or Firm*—Fitzpatrick, Cella, Harper & Scinto

[57] ABSTRACT

An appropriate binarization threshold can be automatically set between the object density and the background density in a multi-level input image, by determining the frequencies of the luminance levels of the entire image, then calculating the average and deviation of the frequencies, then specifying a region containing the optimum threshold for separating the object and the background in the image, by judging the magnitude of the deviation, and taking the average luminance of the specified region as the binarization threshold. Also in processing an image containing objects of three or more luminance levels, highly precise binarization according to the luminance hierarchy allows exact separation of the image regions, enabling precise character recognition process according to the hierarchic luminance levels.

16 Claims, 20 Drawing Sheets

FIG. 4
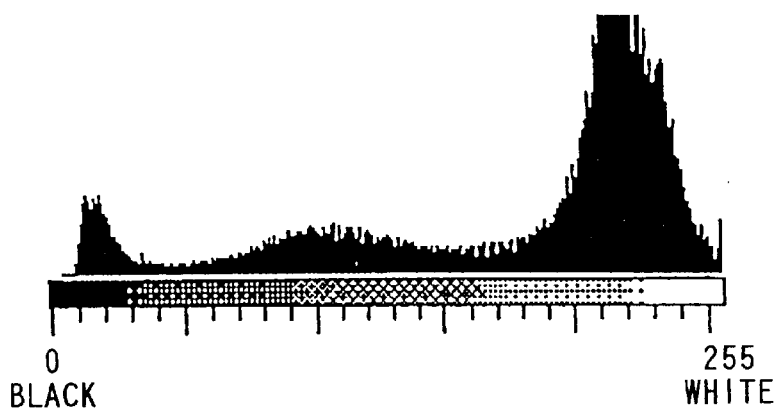
0  255
BLACK  WHITE
FIG. 5
|  | START | END | AV | SK |
|---|---|---|---|---|
| 1ST TIME | 0 | 255 | 177 | -78.9 |
| 2ND TIME | 0 | 177 | 91 | -8.6 |
| 3RD TIME | 0 | 91 | 43 | 9.6 |
| 4TH TIME | 43 | 91 | 72 | -7.0 |
| 5TH TIME | 43 | 72 | 58 | -2.2 |
| 6TH TIME | 43 | 58 | 50 | -0.4 |
FIG. 7
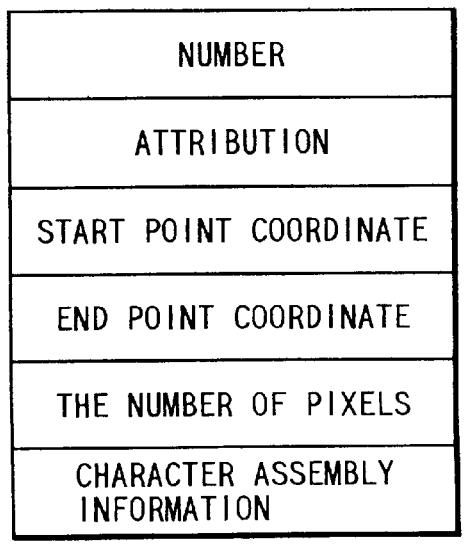

FIG. 13
FIG. 16
|  | START | END | AV | SK |
|---|---|---|---|---|
| 1ST TIME | 0 | 255 | 185 | -102.5 |
| 2ND TIME | 0 | 185 | 98 | -14.6 |
| 3RD TIME | 0 | 98 | 45 | 10.7 |
| 4TH TIME | 45 | 98 | 77 | -8.2 |
| 5TH TIME | 45 | 77 | 63 | -3.0 |
| 6TH TIME | 45 | 63 | 54 | -0.9 |
FIG. 17
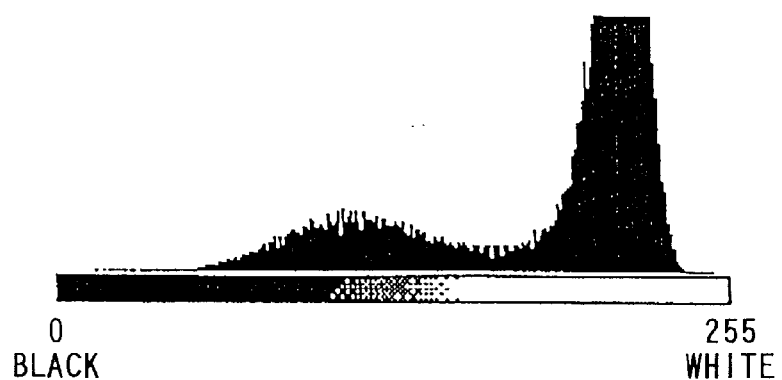

|          | START | END | AV  | SK    |
|----------|-------|-----|-----|-------|
| 1ST TIME | 0     | 255 | 185 | -53.4 |
| 2ND TIME | 0     | 186 | 122 | 4.2   |
| 3RD TIME | 122   | 186 | 149 | 5.8   |
| 4TH TIME | 149   | 186 | 167 | -0.5  |

FIG. 22
| POINT NUMBER | BR VALUE |
|---|---|
| ⋮ | ⋮ |
| 6 | 13 |
| ⋮ | ⋮ |
| 8 | 14 |
| ⋮ | ⋮ |
| 10 | 14 |
| ⋮ | ⋮ |
| ⋮ | ⋮ |
| 20 | 23 |
| ⋮ | ⋮ |
FIG. 23A
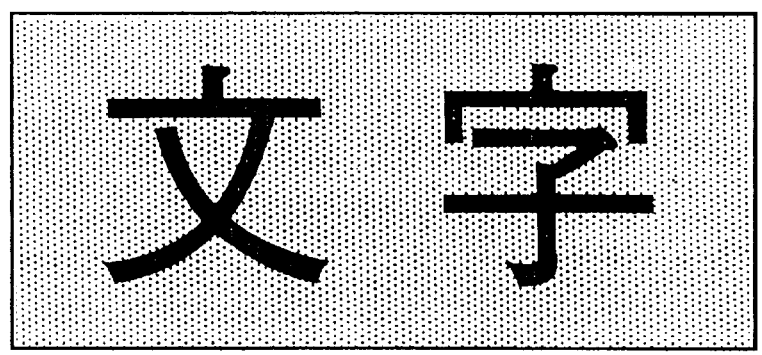
FIG. 23B
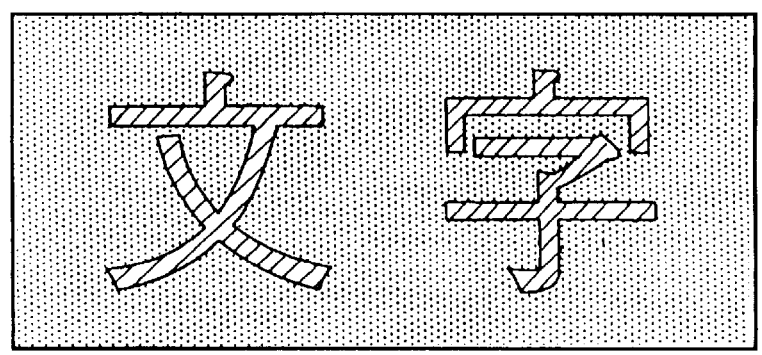

0  29                                    255
BLACK                                    WHITE 0              123              255
BLACK                           WHITE

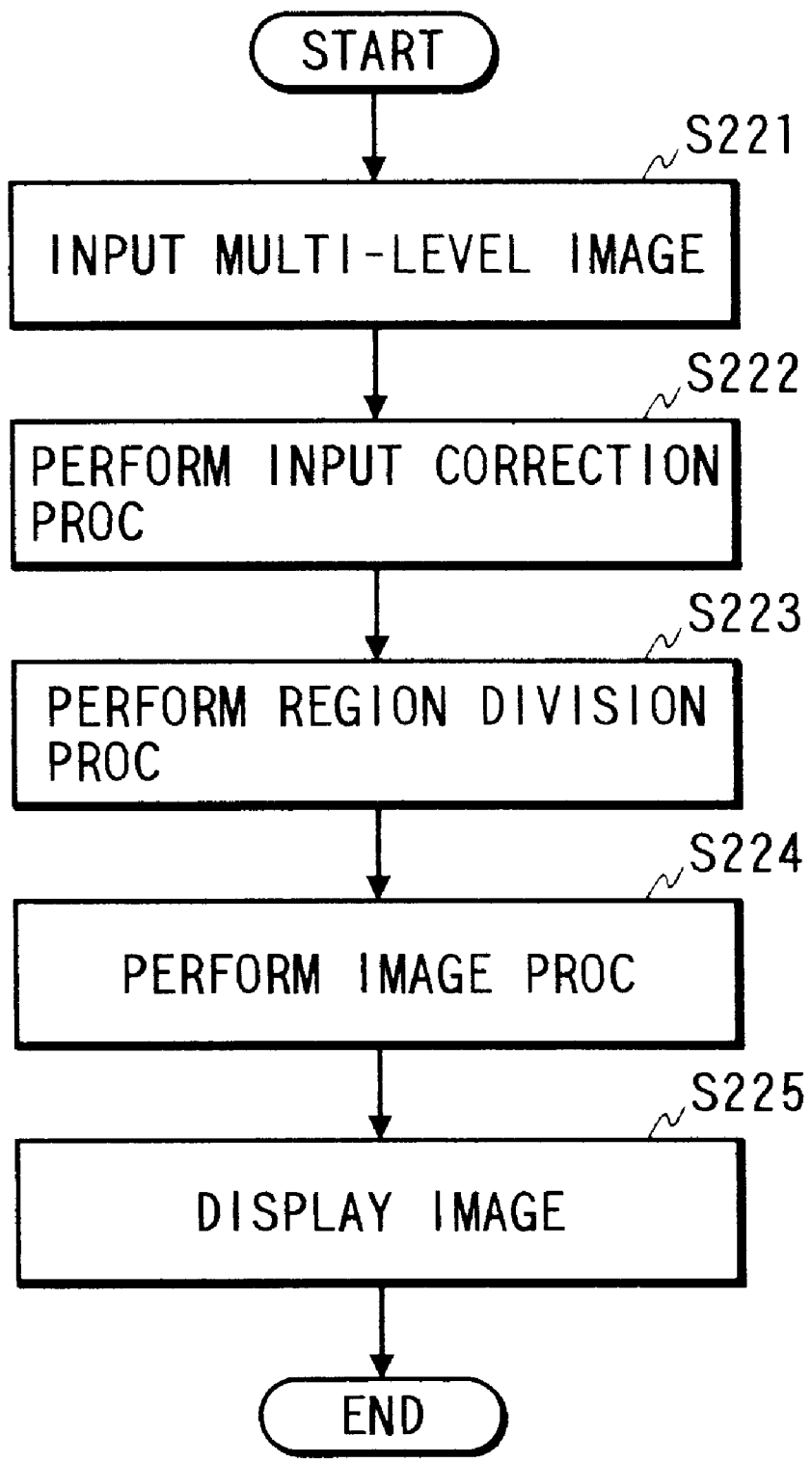

BINARIZATION IMAGE PROCESSING FOR MULTI-LEVEL IMAGE DATA

BACKGROUND OF THE INVENTION

1. Field of the Invention

The present invention relates to an image processing apparatus and a method therefor, for example an image processing apparatus and a method therefor, for effecting binarization by determining a binarizing threshold value for a multi-level image, and more particularly an image processing apparatus and a method therefor effecting division of image regions for a character recognition process in the image.

2. Related Background Art

The image processing technology has shown remarkable progress in recent years, and there has become popular the image processing apparatus capable of processing a multi-level image such as a full-color image and of character recognition in a multi-level image.

In such image processing technology, binarization of the multi-level image is an indispensable technology. For such binarization, there have conventionally known a simple binarizing method utilizing a predetermined fixed threshold value, an Otsu method employing a binarizing threshold value which maximizes the dispersion between two classes divided by this threshold value in the histogram (Otsu, "Automatic threshold selection based on judgment and minimum square method", Journal of Electronic Communication Society, vol. J63-D, No.4, pp.349–356, 1980) and a binarizing method for determining the threshold value for a tonal image, based on the local density.

However such binarizing methods in the conventional image processing apparatus have been associated with the following drawbacks.

In the simple binarizing method with the fixed threshold value, it is difficult to select a suitable threshold value between the density of the object and that of the background within an image, and, as a result, the entire image tends to become blackish or whitish. In the Otsu method, when the two classes have extremely different distributions, the threshold value tends to be deviated toward the higher class, so that a binary image with much noises is generated. Also the binarization method for determining the threshold value according to the local density tends to generate block distortion, as the image is divided into local regions.

With the recent progress in the image processing technology, images mixedly containing characters, photographs, graphs etc. are increasingly processed in the image processing apparatus such as computers. In such case, the image to be processed is at first read by an image input device such as a scanner and entered into the image processing apparatus, which effects, on the input image, a region dividing process for extracting the black pixel areas and an optical character recognition (OCR) process and document management to utilize thus obtained characters and images. The region dividing process is to divide and extract the black pixels in the image, thereby separating the areas of character/photograph/graph/table etc. in the image by the features thereof and obtaining the information of each area. Also the OCR process is to convert, in the character region in the image, the bit map constituting the character images into character codes.

In the following there will be explained, with reference to a flow chart in FIG. 26, the processing of an image containing a character, in the above-explained conventional image processing apparatus.

At first a step S221 enters an original image by an image processing device such as a scanner, in a form, for example, of multi-level image data of 8 bits. A next step S222 effects elimination of the electrical noise, generated in the scanner at the image input, and correction for the deterioration of the input original image and the inclination of the original image. Then a step S223 effects a region dividing process on the input image by the simple binarization with a fixed threshold value and extraction of the character region by releasing the data of each region. The above-mentioned simple binarization process can be, for example, a binarization process according to the density of the input image. Then a step S224 effects character recognition by a desired image processing such as an OCR process or a pseudo continuous tone process on each extracted character region. Then, a last step S225 displays the result of process, such as the recognized character.

In the conventional image processing apparatus, as explained in the foregoing, the input image is subjected to the simple binarizing process with the fixed threshold value or according to the density of the original image and to the region dividing process for extracting the text area in the image, for the purpose of character recognition.

Such conventional image processing apparatus has however been associated with the following drawbacks.

As an example, let us consider a case where the original image has a white background, on which characters are formed in black or gray color. Such original image contains three or more luminance levels, and, in the simple binarization with the fixed threshold value on such image, the gray character region is binarized as "white" in an area and as "black" in the other. As these two areas are generated irregularly, the gray characters become thicker and thinner, so that highly precise binarization cannot be achieved. Consequently the region dividing process and the character recognition process cannot be executed in exact manner, and significant deterioration is encountered in the division of the gray character region and the character recognition rate of the gray characters.

Also in the simple binarization process according to the original image density, as the background is not purely "white", the binarization process results in a classification of the background as "white" and the black and gray characters as "black", or of the background and the gray characters as "white" and the black characters as "black". Thus the gray characters cannot be binarized precisely also in this case, so that the regional division and the character recognition cannot be achieved in exact manner.

Also, even if the gray character region and the gray characters can be recognized, they cannot be distinguished from the black character region and the black characters.

SUMMARY OF THE INVENTION

In consideration of the foregoing, an object of the present invention is to provide an image processing apparatus and a method therefor, capable of automatically setting a suitable binarization threshold value between the object density and the background density in an image.

Another object of the present invention is to provide an image processing apparatus and a method therefor, capable of specifying a region, in the input multi-level image, where a most suitable threshold value for separating the background and the object in the image exists, based on the frequency and deviation of the luminance, and determining the binarization threshold value by the average luminance in said specified region.

Still another object of the present invention is to provide an image processing apparatus and a method therefor, capable of automatically setting a suitable threshold value between the object density and the background density in an input multi-level image, by specifying a region where a most suitable threshold value for separating the background and the object in the image exists, based on the frequency and deviation of the luminance, and adopting the average luminance of thus specified region as the binarization threshold value, thereby enabling to obtain a binarized image in which the object is adequately separated from the background without generation of block distortion.

Still another object of the present invention is to provide an image processing apparatus and a method therefor, capable of a region dividing process and a character recognition process in exact manner, even in processing of an image containing three or more luminance levels, by effecting highly precise binarization for each hierarchy of the luminance.

Still another object of the present invention is to provide an image processing apparatus and a method therefor, capable of highly precise binarization for each luminance level even in processing an image mixedly containing three or more luminance levels, by effecting binarization with a binarization threshold calculated for each luminance hierarchy and then dividing the regions for each luminance hierarchy, thereby achieving exact division of regions over plural luminance hierarchies.

According to the present invention, in particular, it is rendered possible to effect division of regions in different manner for the gray character region and for the black character region, as the regions can be defined for each of plural luminance hierarchic levels.

Still another object of the present invention is to provide an image processing apparatus and a method therefor, capable of highly precise binarization for each luminance level even in processing an image mixedly containing three or more luminance levels, by effecting binarization with a binarization threshold calculated for each luminance hierarchy followed by division of a region, then effecting binarization with a second binarization threshold calculated for a region other than the already divided region, and effecting character recognition for thus binarized character region, thereby achieving the character recognition process in more exact manner.

According to the present invention, in particular, it is rendered possible to effect character recognition in different manner for the gray character region and for the black character region, as the regions can be defined for each of plural luminance hierarchic levels.

Still other objects of the present invention, and the features thereof, will become fully apparent from the following detailed description which is to be taken in conjunction with the attached drawings.

BRIEF DESCRIPTION OF THE DRAWINGS

FIG. 4 is a view showing an example of histogram of the image in the first embodiment;

FIG. 5 is a chart showing an example of transition of variables in the binarization process of the first embodiment;

FIG. 7 is a view showing an example of the regional data in the first embodiment;

FIG. 13 is a view showing an example of histogram of the image in the second embodiment;

FIG. 16 is a chart showing an example of variables in the region dividing pre-process of the second embodiment;

FIG. 17 is a view showing an example of histogram in a region, with a hierarchic luminance number "2", in the original image in the second embodiment;

FIG. 22 is a view showing an example of the table for setting the black ratio in the second embodiment;

FIGS. 23A and 23B are views showing examples of the multi-level input image in the second embodiment;

FIG. 26 is a flow chart showing a character-containing image processing in a conventional image processing apparatus.

DETAILED DESCRIPTION OF THE PREFERRED EMBODIMENTS

Now the present invention will be clarified in detail by preferred embodiments thereof, with reference to the attached drawings.

[First embodiment]

Figure 1:
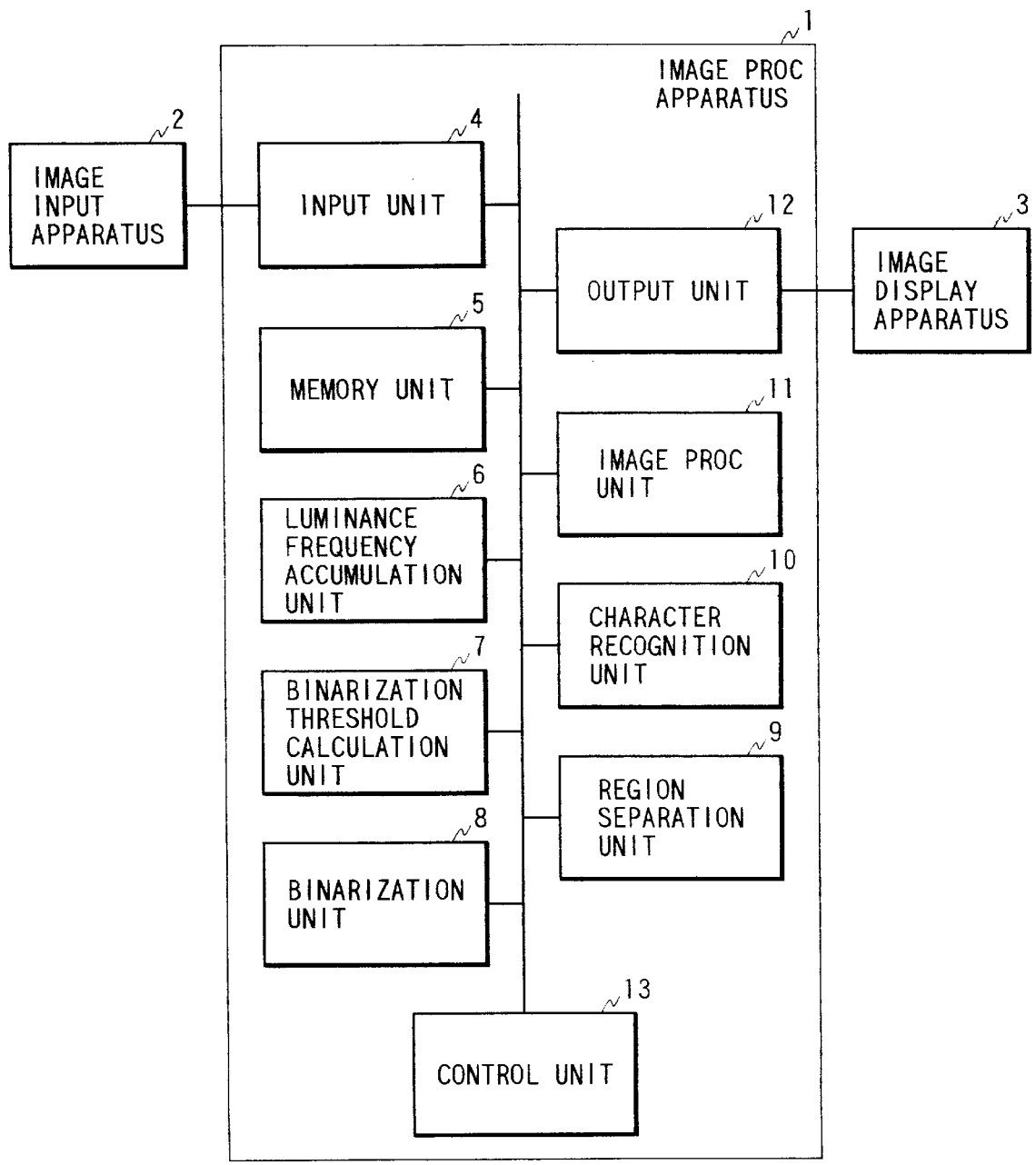
FIG. 1 is a block diagram showing the system configuration of an image processing apparatus embodying the present invention.

FIG. 1 is a block diagram showing the configuration of a system for executing the binarization process in a first embodiment. In FIG. 1, there are provided an image processing apparatus 1 for effecting the character recognition process; an image input device 2 such as a scanner, for entering an image; and an image display apparatus 3 for displaying an image after processing.

In the image processing apparatus 1, there are provided an input unit 4 constituting an interface with the image input device 2; a memory unit 5 for storing the data in processing; a luminance frequency accumulation unit 6 for accumulating the luminance frequency (histogram) of the input image; a binarization threshold calculation unit 7 for calculating the binarization threshold of the input image; a binarization unit 8 for generating a binary image with the threshold value calculated in the binarization threshold calculation unit 7; a region separation unit 9 for separating the image into regions, such as a character region and a halftone regions, according to the attributes; a character recognition unit 10 for effecting a character recognition process for a character region extracted by the separation of the regions; an image process unit 11 for effecting various image processes on a separated halftone region other than the character region; an output unit 12 constituting an interface with the image display device 3; and a control unit 13 controlling the entire image processing apparatus 1 and composed of a CPU, a ROM and a RAM.

In the following there will be explained an OCR process executed in the image processing apparatus 1 of the present embodiment, with the above-explained configuration.

Figure 2:
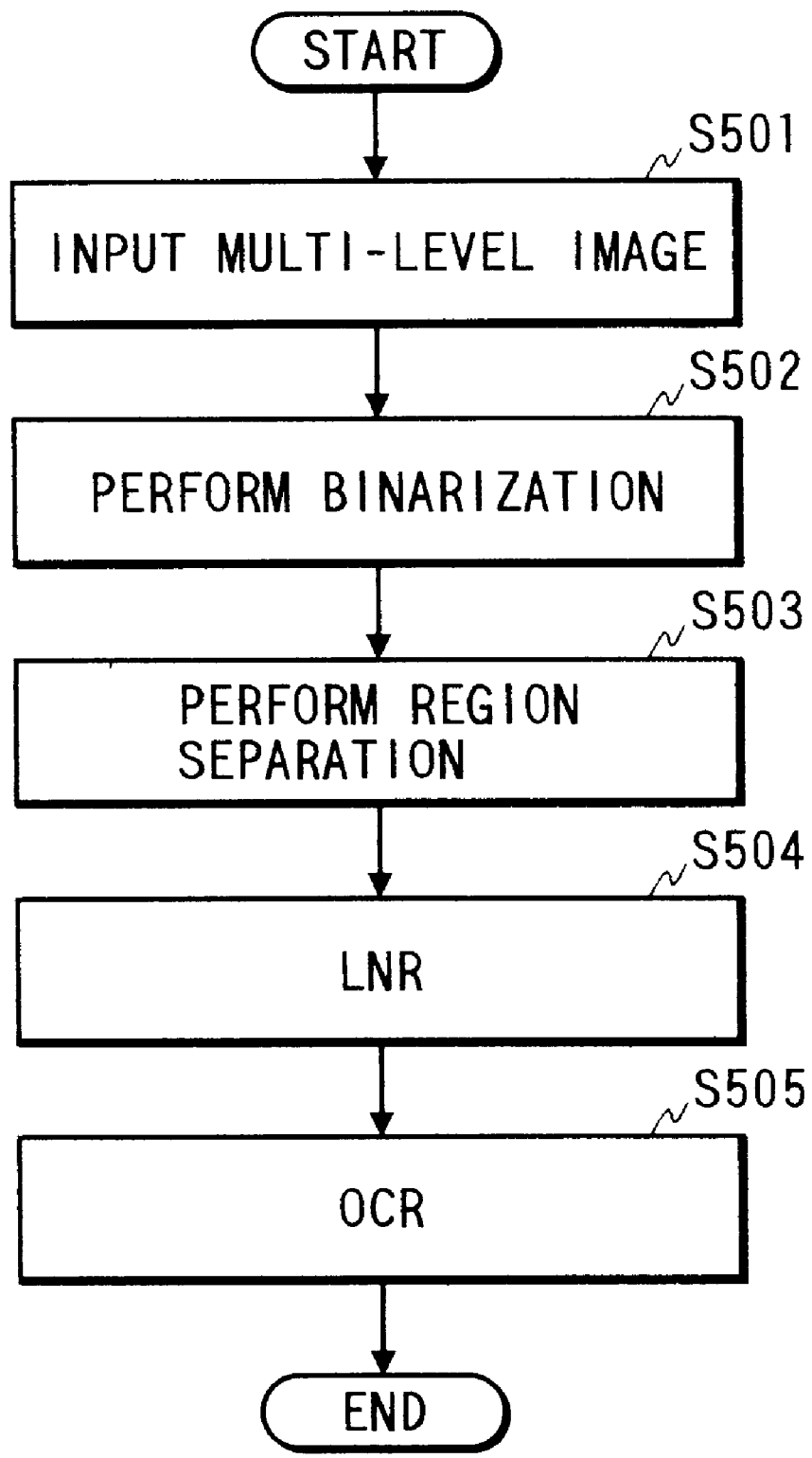
FIG. 2 is a flow chart showing an image region separating OCR process in a first embodiment.

FIG. 2 is a flow chart showing an image region separating OCR process utilizing the binarization threshold determining method which features the present embodiment.

At first a step S501 enters image data, in the form of 8-bit multi-level image data, by the image input device 2 such as a scanner. A next step S502 determines an optimum binarization threshold for the separation of regions, featuring the present embodiment, on the multi-level image entered in the step S501, and generates a binary image by the above-mentioned binarization threshold. Then a step S503 effects separation of the regions in the binary image generated in the step S502, and releases regional data associated with attribute thereof. A next step S504 eliminates error in the result of judgment contained in the regional data, separated in the step S503. The error elimination process in the step S504 will be hereinafter called the layout noise reduction (LNR). Then a step S505 cuts out, from the binary image, a region designated as "text" in the regional data separated in the step S503, then effects the OCR process on such binary image and releases the recognized character code.

[Binarization process]

In the following there will be explained the details of the binarization process in the step S502 of the present embodiment, with reference to a flow chart in FIG. 3.

Figure 3:
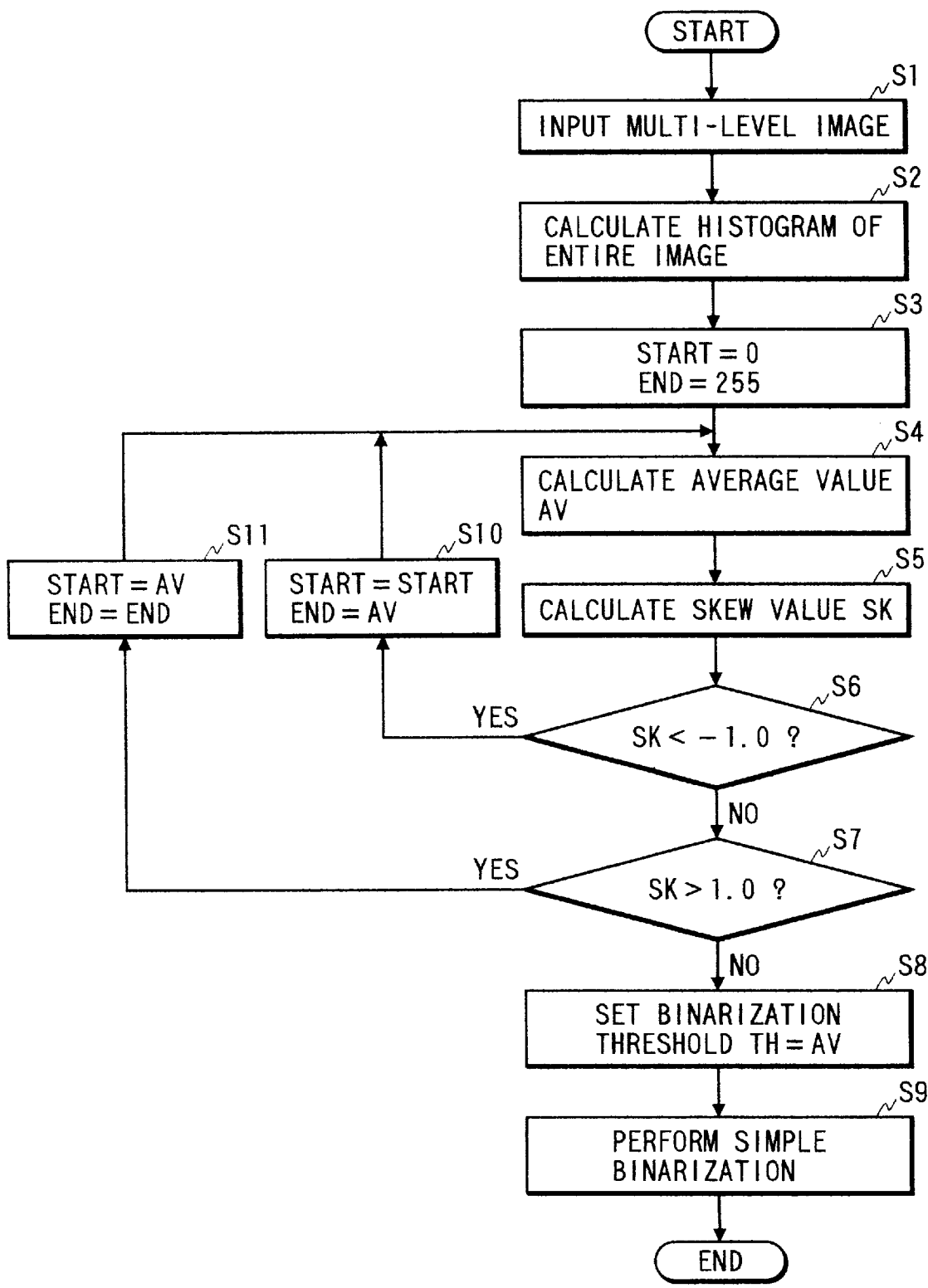
FIG. 3 is a flow chart showing a binarization process in the first embodiment.

Referring to FIG. 3, a step S1 enters the 8-bit multi-level image from the memory unit 5 of the image processing apparatus 1 to the RAM in the control unit 13. This multi-level image is stored in advance in the memory unit 5, by means of the image input device 2 such as the scanner. Then a step S2 calculates a histogram of the entire input image, utilizing all the pixels in the image and determining the frequency for each digital value of 8 bits, i.e from "0" to "255". Thus there can be obtained a histogram as shown in FIG. 4.

A next step S3 sets "0" and "255" respectively to parameters START and END, which respectively correspond to a start point and an end point of the statistical luminance values determined in the following steps S4 and S5.

A step S4 calculates an average AV value of the pixels corresponding to the digital values from START to END.

For example, for a case START=0 and END=255, the average AV is calculated for the pixels of the values from "0" to "255", namely all the pixels. For a case START=0, END=177, the average AV is calculated for the pixels of the values from "0" to "177".

A step S5 calculates a skew value SK of the pixels corresponding to the luminance values from START to END. The skew value is a statistical amount indicating the deviation of the distribution of the histogram. The skew value SK is calculated by the following equation (1):

$$SK=(\Sigma(Xi-AV)^3)/D \qquad (1)$$

wherein $R^e$ represents a cube of R, Xi is the luminance value of the pixel, and D is the dispersion of the entire image, calculated by the following equation (2):

$$D=\Sigma(Xi-AV)^2 \qquad (2)$$

wherein $R^2$ indicates a square of R.

In the foregoing equation (1), the skew value is obtained by a third power of the difference between the luminance of each pixel and the average thereof, but there may also be employed any odd-numbered power instead of the third power.

Subsequent steps S6, S7 judge the direction of deviation of the histogram. At first a step S6 judges the direction of the deviation of the histogram by the following condition (3):

$$SK<-1.0 \qquad (3)$$

for judging whether the deviation of the histogram is within a range smaller than the average AV.

The sequence proceeds to a step S10 or S7, respectively if the condition (3) is satisfied or not in the step S6. The step S10 sets the average AV as END, while maintaining START unchanged. Then the sequence returns to the step S4 to calculate again the average AV of the pixels from START to END.

On the other hand, the step S7 judges the direction of the deviation of the histogram by the following condition (4):

$$SK>1.0 \qquad (4)$$

for judging whether the deviation of the histogram is within a range larger than the average AV.

The sequence proceeds to a step S11 or S8, respectively if the condition (4) is satisfied or not in the step S7. The step S11 sets the average AV as START, while maintaining END unchanged. Then the sequence returns to the step S4 to calculate again the average AV of the pixels from START to END.

On the other hand, the step S8 sets the average AV, in case the conditions in the steps S6 and S7 are both unsatisfied, as the binarization threshold TH, and a step S9 effects simple binarization with such binarization threshold TH.

The binarization process in the present embodiment is executed in the above-mentioned manner, but the ranges represented by the conditions (3) and (4) are not limited to the figures mentioned above.

In the following, the binarization process of the present embodiment will be clarified further, with an example of a specific image.

Reference is now made to FIG. 4, showing an example of the histogram, for explaining the determination of the binarization threshold TH in the present embodiment.

FIG. 4 is the histogram of an 8-bit input image, wherein the abscissa indicates the digital values of luminance, from "0" or black at the left-hand end to "255" or white at the right-hand end, while the ordinate indicates the frequency of each digital value. FIG. 5 shows the variation of the parameters for the image having the histogram shown in FIG. 4, in the process of the steps S4 and S5 in the binarization shown in FIG. 3. FIG. 5 shows the variation of each parameter, as a function of the number of cycles through the steps S4 and S5.

At first, in the first cycle through the steps S4 and S5, the average AV and the statistical skew SK are respectively calculated as "177" and "−78.9" for START=0 and END= 255. As the statistical amount SK is less than "−1.0", the step S10 sets START=0 and END=177.

The second cycle provides the average AV and the statistical amount SK respectively as "91" and "−8.6" for START=0, END=177. Since the statistical amount SK is again less than "−1.0", the step S10 sets START=0, END= 91.

The third cycle provides the average AV and the statistical amount SK respectively as "43" and "9.6" for START=0, END=91. As the statistical amount SK exceeds "1.0" in this case, the step S11 sets START=43, END=91.

The fourth cycle provides the average AV and the statistical amount SK respectively as "72" and "−7.0" for START=43, END=91. As the statistical amount SK is less than "−1.0", the step S10 sets START=43, END=72.

The fifth cycle provides the average AV and the statistical amount SK respectively as "58" and "−2.2" for START=43, END=72. As the statistical amount SK is again less than "−1.0", the step S10 sets START=43, END=58.

The sixth cycle provides the average AV and the statistical amount SK respectively as "50" and "−0.4" for START=43, END=58. The statistical amount SK, being larger than "−1.0" and smaller than "1.0", does not satisfy the conditions of the steps S6 and S7, so that the step S8 sets "50" as the binarization threshold TH. Then the step S9 executes simple binarization with the binarization threshold TH, and the binarized image is stored in the memory unit 5.

As explained in the foregoing, the present embodiment executes binarization by so determining the binarization threshold that the skew value converges to a predetermined value. More specifically, in the input multi-level image, there is specified a region containing a threshold value most suitable for separating the background and the object in the image, based on the frequency of luminance and the deviation thereof, and the average luminance of thus specified region is adopted as the binarization threshold. Such method allows to automatically determine the optimum threshold for dividing the luminance of the pixels, in a region on the multi-level input image, into two classes, i.e. the background and the object.

[Image region separation process]

In the following there will be explained, with reference to a flow chart in FIG. 6, the details of the image region separation process in the step S503 in FIG. 2.

At first a step S601 enters and stores a binary image in the memory unit 5. Then a step S602 effects thinning of the input image in such a manner that m×n pixels become one pixel, thereby generating an image for image region separation. In this operation, if the m×n pixels contain at least one black pixel, these m×n pixels are transformed into a black pixel.

Then a step S603 separates a region in which the black pixels are present in continuation for a predetermined number in the vertical, horizontal or diagonal direction, among all the pixels of the image for image region separation. In this operation, the regions are labelled by numbers attached in the order of detection of the regions. Then a step S604 classifies the regions, by the weight, height, area, and black pixel density in the region, provides each region with an attribute, which can be "table", "outer frame area", "text" etc. as will be explained later in more details.

A next step S605 calculates the averages of the width and the height of all the regions labeled as "text" and judges the character assembly as written in the horizontal direction or written in the vertical direction, respectively if the obtained average width is larger or smaller than the obtained average height. At the same time the character size of each character is given by the average height in case of horizontally written assembly or by the average width in case of vertically written assembly.

Also the column assembly and the line pitch are detected from the histogram of all the "text" regions in the vertical direction (in case of horizontally written assembly) or in the horizontal direction (in case of vertically written assembly) on the image for image region separation. A step S606 takes a "text" region with a larger character size as a "title". Then a step S607 combines the "title" areas and the "text" regions scattered in unrelated manner, into a united area, according to the distances to the surrounding regions. Then a step S608 provides each region with regional data, such as the coordinate and the size in the original image.

In the present embodiment, the process explained above effects separation of the image regions in the binary image and provides the data or each region.

FIG. 7 shows an example of the regional data mentioned above, of which items will be explained in the following.

"Number" indicates the order of detection of the region;

"Attribute" indicates attribute information of the region, classified into following eight attributes:
  "Root" means the input image itself;
  "Text" means a character region;
  "Title" means a title region;
  "Table" means a table region;
  "Noise" means a region not identiable as a character region nor an image region;
  "Frame" means a line region constituting a table or the like;
  "Photograph image" means a photograph region;
  "Line image" means a line image region.

"Start point coordinate" indicates X, Y coordinates starting a region in the original image;

"End point coordinate" indicates X, Y coordinates ending a region in the original image;

"Pixel number" indicates the number of all the pixels in the original image;

"Character assembly information" indicates the information on the character assembly, which is vertical writing, horizontal writing or unidentified.

Figure 6:
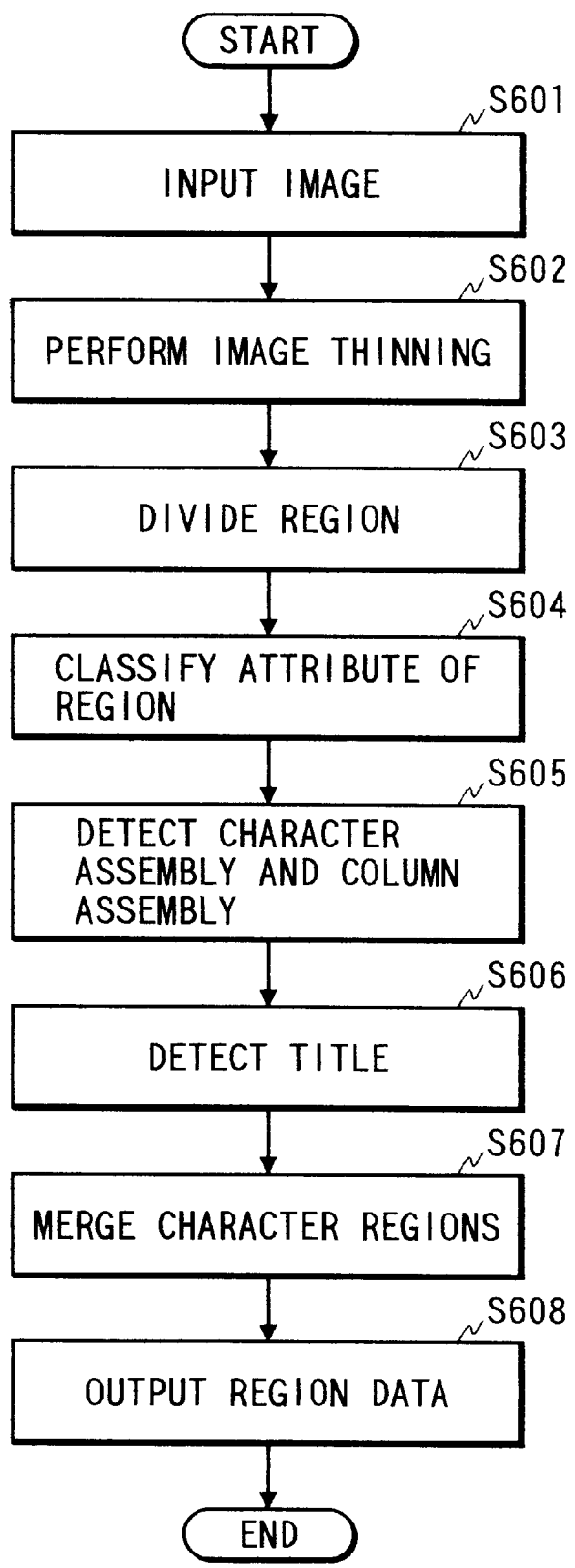
FIG. 6 is a flow chart showing an image region separating process in the first embodiment.

With respect to the regional data shown in FIG. 7, only the region with the attribute thereof classified as "text" retains, in hierarchic manner, the regional data on the lines (line regional data) prior to the combination in the step S607 in FIG. 6.

As explained in the foregoing, the present embodiment effects separation of the image regions. It is to be noted that the regional data shown in FIG. 7 are merely an example of the application of the present embodiment, and may be suitably expanded or decreased depending on the image processing apparatus.

[LNR process]

In the following there will be explained the details of the LNR process in the step S504 in FIG. 3, with reference to a flow chart in FIG. 8. The LNR process is to eliminate, from the separated image regions, those containing errors in the image region separation.

Figure 8:
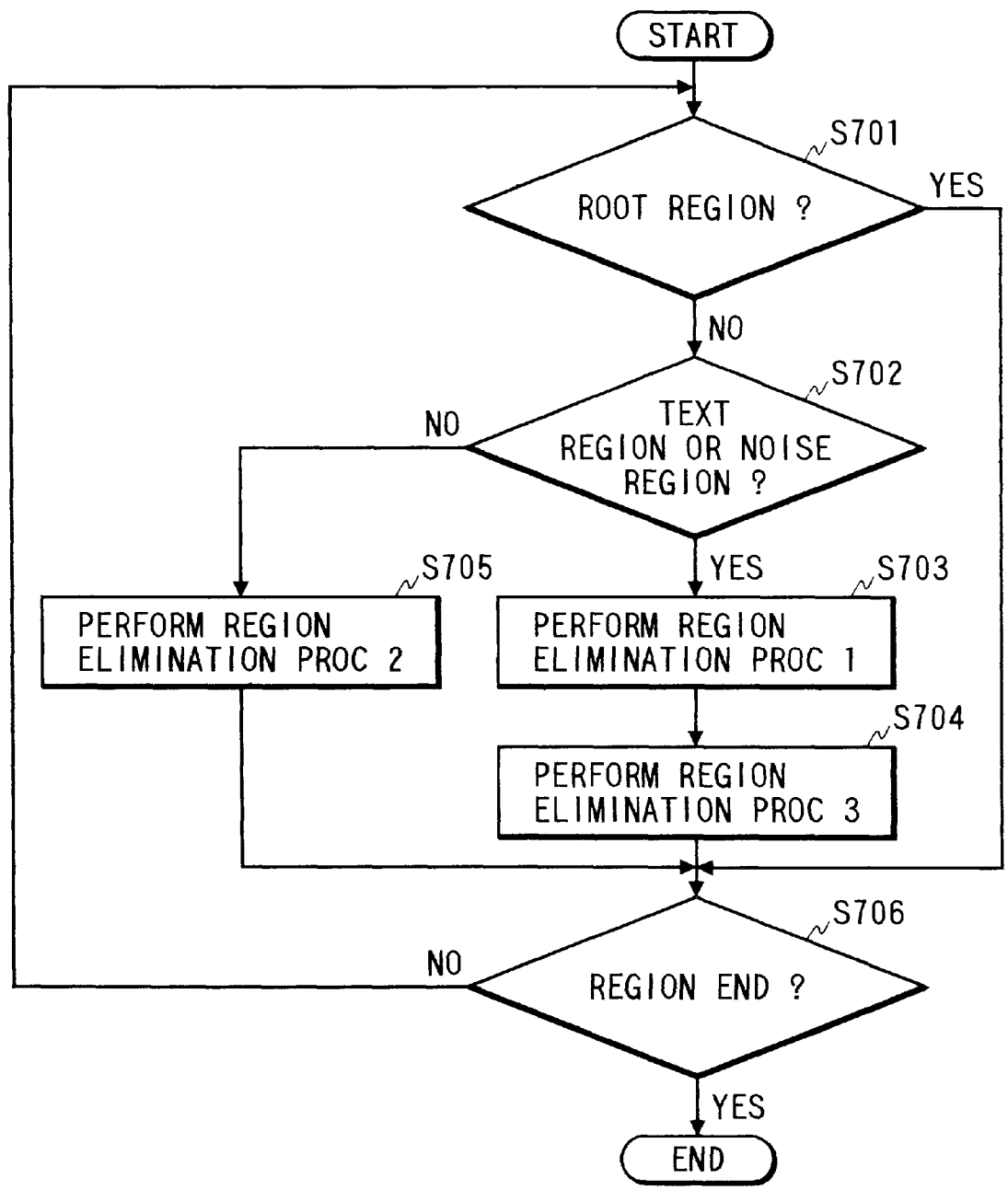
FIG. 8 is a flow chart showing a region elimination (LNR) process in the first embodiment.

At first a step S701 in FIG. 8 discriminates whether the regional data after the image region separation indicate a room region. The root region means a region surrounding the entire image, namely an entire region. If the data indicate the root region, the sequence proceeds to a step S706 without the LNR process. If not the root region, a step S702 discriminates whether regional data indicate a text (character) region or a noise region, and, in case of a text or noise region, the sequence proceeds to a step S703, but, if neither, the sequence proceeds to a step S705.

The step S703 effects an LNR1 process for eliminating the regional data, as an error in the region separation, according to the regional size, and a step S704 effects an LNR3 process for eliminating the regional data as an error in the region separation according to the black ratio within the region. On the other hand, the step S705 effects an LNR2 process for eliminating the regional data which are not identified as a text region nor a noise region, as an error in the region separation according to the size of the region. The LNR 1, 3 and 2 processes in the steps S703, S704 and S705 will be detailedly explained in the following.

Then a step S706 discriminates whether all the regions have been processed, and, if not, the sequence returns to the step S701, but, it completed, the LNR process is terminated.

In the following there will be explained the details of the LNR1 process in the step S703.

Figure 9:
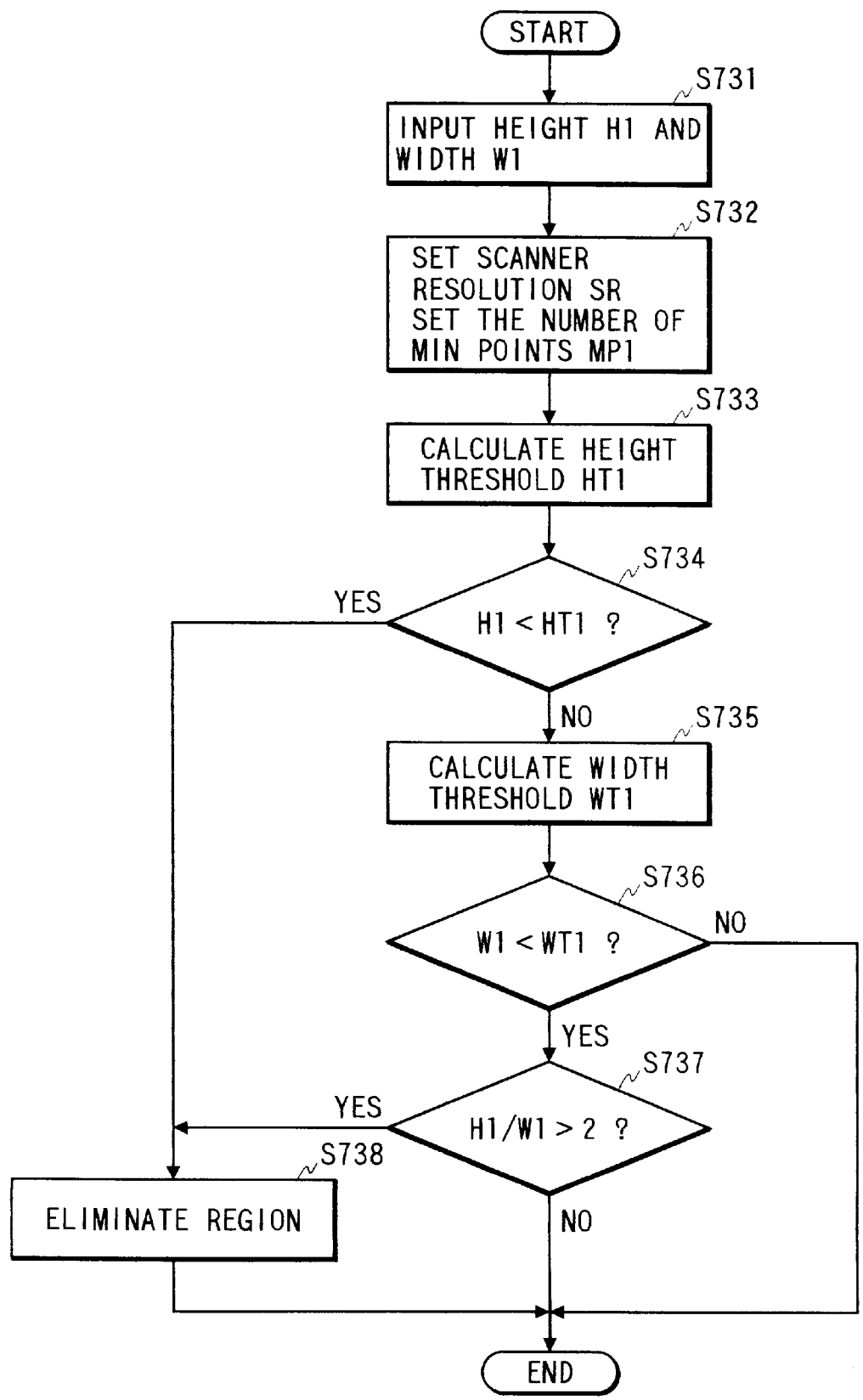
FIG. 9 is a flow chart showing a region elimination process 1 according to the regional size in the first embodiment.

FIG. 9 is a flow chart showing the LNR1 process. At first a step S731 reads the height H1 and the width W1 from the regional data of the region to be processed. Then, for calculating a height threshold HT1 and a width threshold WT1 to be used in the judgement of the region size, a step S732 sets the reading resolution SR of the image input device 2, such as the scanner, and also sets a point size MP1 of the minimum character, uneliminated in the image as MP1h and MP1w respectively for the heat and the width.

In the present embodiment, the thresholds HT1 and WT1 are calculated according to the following equations (5) and (6):

$$HT1 = (SR/72.0) \times MP1h \qquad (5)$$

$$WT1 = (SR/72.0) \times MP1w \qquad (6)$$

A step S733 calculates the height threshold HT1 according to the equation (5). For example, in case the image input device 2 has a resolution SR of 400 dpi and the minimum character in the image has a height MP1h of 4 points the height threshold HT1 is calculated as "22". Then a step S734 compares the height H1 of the regional data with the height threshold HT1 calculated in the step S733, and the sequence proceeds to a step S735 or S738 respectively if the former is larger or smaller.

A step S735 calculates the width threshold WT1 according to the equation (6). Then a step S736 compares the width W1 of the regional data with the width threshold WT1, calculated in the step S735, and the LNR process is terminated if the former is larger, but, if the former is smaller, the sequence proceeds to a step S737 for judging the ratio H1/W1 of the height H1 and the width W1 of the regional data. The LNR1 process is terminated if the ratio does not exceed "2", but, if it exceeds "2", there is identified an error in the separation of the region in process, and the sequence proceeds to a step S738 to eliminate this region.

Figure 10:
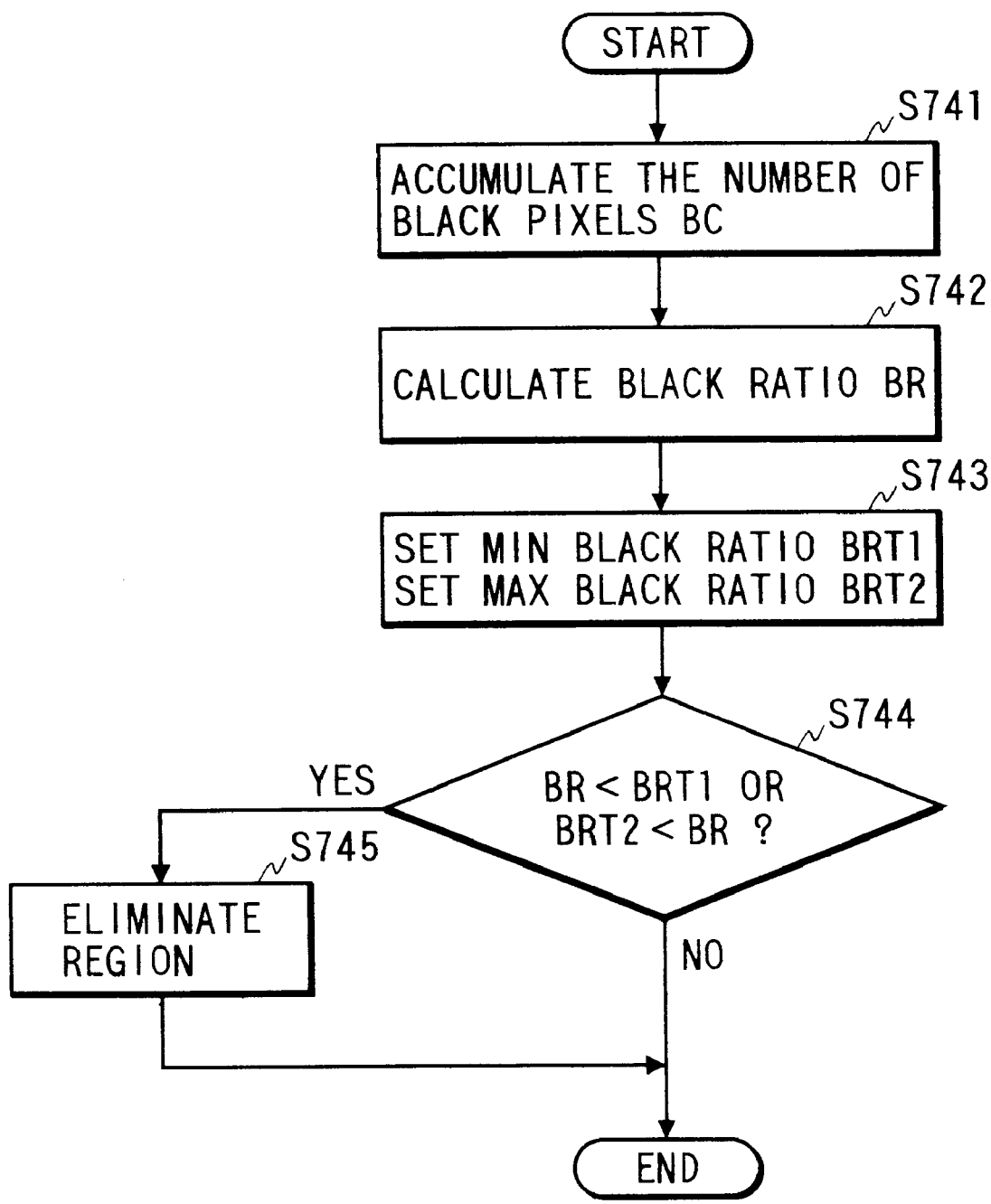
FIG. 10 is a flow chart showing a region elimination process 2 according to the black ratio in the first embodiment.

In the following there will be explained the details of the LNR3 process in the step S704 in FIG. 8, with reference to a flow chart in FIG. 10. At first a step S741 accumulates the number of black pixels in the region, and a step S742 calculates the black ratio BR in the region according to the following equation (7):

$$BR1 = BC/(W1 \times H1) \times 100 \qquad (7)$$

Then a step S743 sets a minimum black ratio BRT1 and a maximum black ratio BRT2, which are determined in advance according to the black ratio characteristics of the characters, for example BRT1=5 and BRT2=52.

A step S744 compares the black ratio BR of the region with the minimum black ratio BRT1 and the maximum black ratio BRT2. If the black ratio BR is smaller than the minimum black ratio BRT1 or larger than the maximum black ratio BRT2, there is identified an error in the separation of the region in process, and the sequence proceeds to a step S745 to eliminate the region. In other cases the LNR3 process is terminated.

Figure 11:
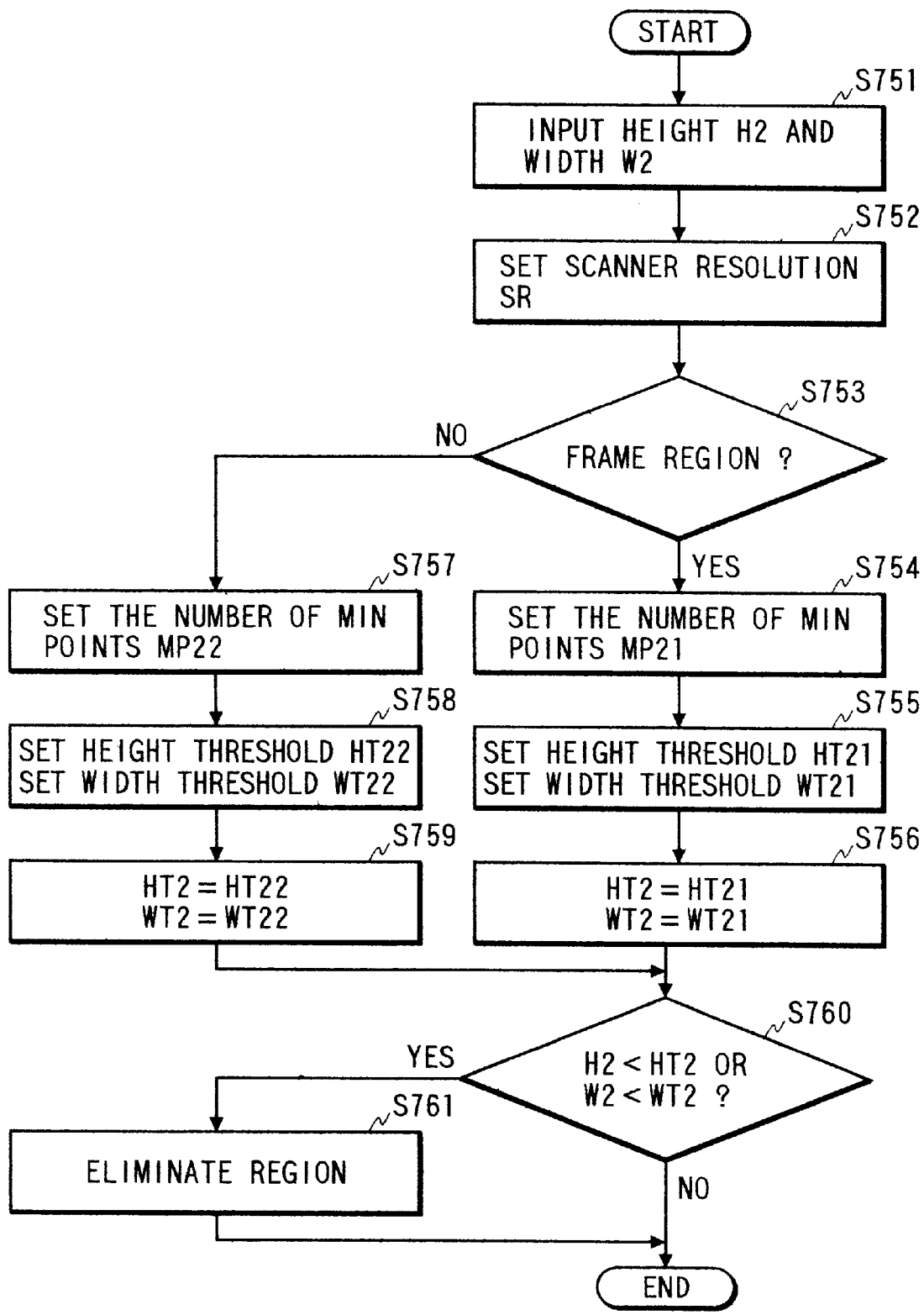
FIG. 11 is a flow chart showing a region elimination process 3 according to the regional size in the first embodiment.

In the following there will be explained the details of the LNR2 process of the step S705 in FIG. 8, with reference to a flow chart in FIG. 11. At first, a step S751 reads the height H2 and the width W2 from the regional data of the region to be processed, and, for calculating a height threshold HT2 and a width threshold WT2 to be used in the judgment of the rational size, a step S752 sets the resolution SR of the image input device 2. Then a step S753 discriminates whether the attribute of the region in process indicates a frame region, and the sequence proceeds to a step S754 or S757 respectively if the frame area is indicated or not.

A step S754 sets a minimum point number MP21 as MP21h, MP21w respectively for the height and the width. Also a step S757 sets a minimum point number MP22 as MP22h, MP22w respectively for the height and the width. The minimum point numbers MP21, MP22 indicate the minimum size, represented by the character point, of the region not eliminated in the LNR2 process respectively in the frame region or another region.

Steps S755, S758 calculate the height thresholds HT21, HT22 and the width thresholds WT21, WT22 according to the foregoing equations (5) and (6). For example, in case the image input device 2 has a resolution SR of 400 dpi and the minimum point number is 4 points for the height and the width, the thresholds HT22, WT22 are both calculated as "22". Then steps S756 and S759 respectively set the height threshold HT2 and the width threshold WT2.

A next step S760 effects comparisons of the height H2 of the regional data with the height threshold HT2 set in the steps S756 and S759, and of the width W2 of the regional data with the width threshold WT2. If the height H2 of the regional data is smaller than the height threshold HT2 or if the width W2 is smaller than the width threshold WT2, there is identified an error in the separation of the region in process, and a step S761 eliminates the region. In other cases the LNR2 process is terminated.

As explained in the foregoing, the LNR process of the present embodiment eliminates the region where the error in the separation of the region is identified, by three different procedures.

As explained in the foregoing, the present embodiment allows to automatically determine an optimum threshold in classifying the luminance of the pixels in the region on a multi-level input image, into two classes of the object and the background. It is therefor possible to adequately separate the object and the background in the multi-level image, thus achieving a highly precise OCR process.

In the foregoing first embodiment, the input image is assumed to be composed of 8-bit multi-level image data, but the present invention is not limited to such case and is applicable to any image information containing plural bits for binarization, such as a color image.

Also the sampling of the image for histogram calculation may be made on every pixel or a pixel on every several pixels. Also the calculation of the average AV or the statistical amount SK need not necessarily be conducted with 8 bits but can instead be conducted with a fewer number of bits for the purpose of achieving a higher speed or reducing the memory capacity.

Also the statistical skew amount SK is defined by a converging condition of ±1.0, but such condition is not limitative and there may be adopted any configuration for determining the binarization thresholds by the skew SK.

As explained in the foregoing, the first embodiment of the present invention allows to automatically set an adequate threshold between the object density and the background density in a multilevel input image, by specifying a region containing an optimum threshold for separating the object and the background, based on the frequency and the deviation of the luminance, and then taking the average luminance of the specified region as the binarization threshold, thereby obtaining a binary image in which the object is adequately separated from the background without generation of block distortion.

[Second embodiment]

The system configuration of the second embodiment will not be explained as it is same as that of the first embodiment.

Figure 12:
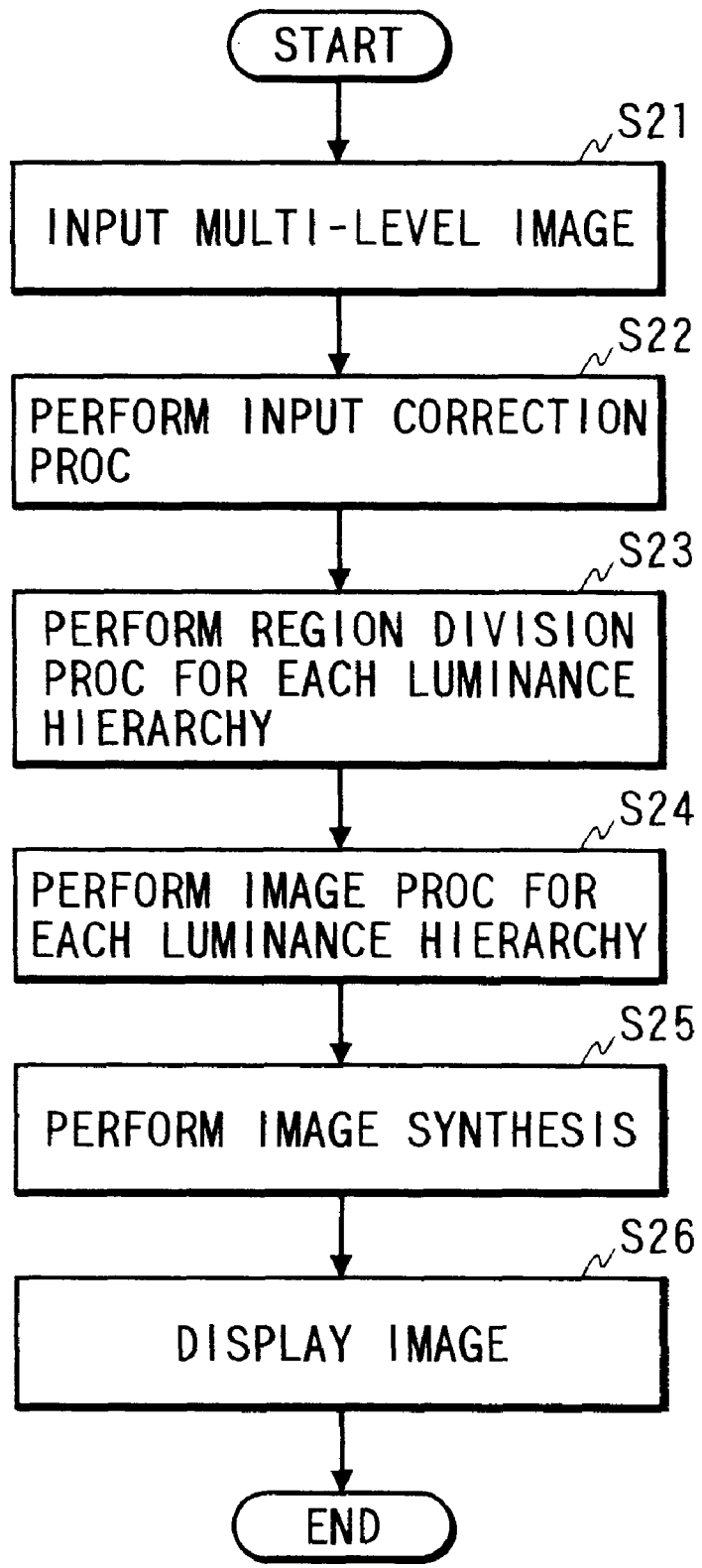
FIG. 12 is a flow chart showing a character-containing image processing in a second embodiment.

In the following the image processing in the image processing apparatus 1 of the second embodiment will be explained with reference to a flow chart in FIG. 12.

At first a step S21 enters an original image into the image processing apparatus 1 through the input unit 4. The input image, in the form of 8-bit multi-level image data, is stored in an unrepresented work memory. Then a step S22 effects elimination of the electric noise generated in the image input device 2 at the image input, and corrections on the input image, such as for the deterioration of the original image and the inclination thereof. Then a step S23 effects a binarization process for each level of the luminance hierarchy by the luminance frequency accumulation unit 6, the binarization threshold calculation unit 7 and the binarization unit 8, and a region separation process by the region separation unit 9. The details of the region separation process according to the luminance hierarchy in the step S23 will be explained later.

Then a step S24 effects, according to the result of the region separation according to the luminance hierarchy in the step S23, an OCR process by the character recognition unit 10 for a character recognition, or an image processing such as a pseudo halftone process by the error diffusion method or by the dither method in the image process unit 11, in another region. Then a step S25 synthesizes the regions processed for respectively hierarchic levels into an image, and a step S26 displays the synthesized image on the image display device 3 through the output unit 12.

[Region separation process dependent on luminance hierarchy]

In the following there will be explained the details of the region separation process by the luminance hierarchy, in the step S23 in FIG. 12.

The present embodiment will be explained by an example of processing an image in which black and gray characters are provided on a white background.

FIG. 13 is a histogram, showing the frequency of the luminance of an image, including a character region to be processed in the present second embodiment.

In FIG. 13, the abscissa indicates the luminance in digital values from "0" or black at the left-hand end and "255" or white at the right-hand end, and the ordinate indicates the frequency of each digital luminance. Thus, in FIG. 13, the white area of the processed image, having a high luminance, corresponds to a peak at the right-hand side, while the area of black characters, having a low luminance, corresponds to a peak at the left-hand side, and the gray characters having the intermediate luminance correspond to a peak in the middle.

In the following there will be explained the region separation process, dependent on the luminance hierarchy, of the present second embodiment, with reference to a flow chart in FIG. 14.

At first a step S31 sets a luminance hierarchy number as "1". The luminance hierarchy number is set according to the feature (number of peaks) in the frequency of luminance in the image, and, in the example shown in FIG. 13, the luminance hierarchy number is "1" for the black characters, "2" for the gray characters and "3" for the white area. The luminance hierarchy number is given to each luminance level in which the character recognition is to be conducted.

A next step S32 executes, as a pre-process for the region separation, simple binarization with a threshold optimum for the region separation. Then a step S34 extracts a black pixel region from the binarized image, effects separation into a text region, a photograph region, a pattern region etc. according to the feature of the black pixel region, and releases the regional data to be explained later. Then a step S34 effects, as a post-process of the region separation, elimination of the region in error, of which details will be explained later. Then a step S35 discriminates whether the luminance hierarchy number is equal to or less than "1". If the luminance hierarchy number is equal to or less than "1", namely if it is "1", the sequence proceeds to a step S36, but, if not, namely if it is equal to "2" or larger, the process is terminated.

In the discrimination of the step S35 for judging whether the luminance hierarchy number is equal to or less than "1", this value is determined by subtracting a fixed value "2" from the maximum luminance hierarchy number "3", so that the present embodiment can adapt to an increase or a decrease in the number of hierarchic luminance levels.

A step S36 deletes a black pixel region with the luminance hierarchy number "1", separated as black characters, as an already separated region, from the input image and stores it in the memory unit 5. This deletion allows to effect the separation of the gray character region with the luminance hierarchy number "2", only in the regions other than the black character regions with the luminance hierarchy number "1". Thus a step S37 adds "1" to the luminance hierarchy number, and the sequence returns to the region separating pre-process in the step S32.

As explained in the foregoing, the region separation by luminance hierarchy in the present embodiment at first effects binarization for the black character regions with the luminance hierarchy number "1", followed by separation of the regions and elimination of error in the region, and, after the deletion of thus separated black pixel regions, effects binarization for the gray character regions with the luminance hierarchy number "2", followed by separation of the regions and elimination of error in the region.

[Region separation pre-process (binarization)]

In the following there will be explained the details of the binarization as the pre-process for region separation in the step S32 in FIG. 14, with reference to a flow chart in FIG. 15. The pre-process in the step S32 is executed twice, for the luminance hierarchy numbers "1" and "2", with respective thresholds TH1 and TH2, which are collectively represented as TH in FIG. 15.

At first there will be explained a case for the luminance hierarchy number "1".

Figure 15:
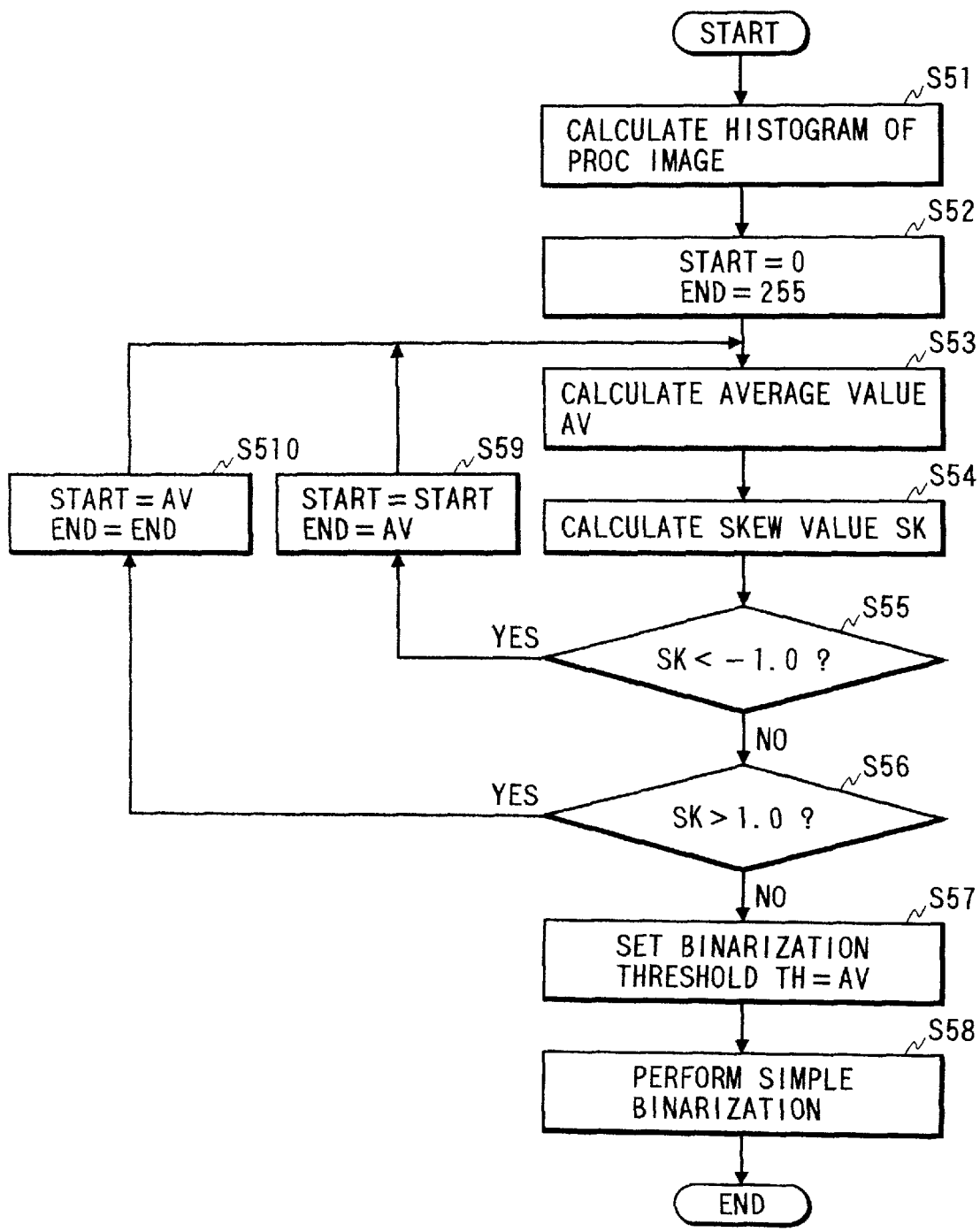
FIG. 15 is a flow chart showing a region dividing pre-process in the second embodiment.

Referring to FIG. 15, a step S51 calculates the histogram of the input image, by calculating the frequency of the 8-bit values from "0" to "255" for all the pixels in the image. Thus obtained is a histogram as shown in FIG. 13.

Then a step S52 sets "0" and "255" respectively for parameters START and END, which correspond to the start and end points of a statistical luminance amount determined in subsequent steps S53 and S54.

A step S53 calculates the average AV of the pixels corresponding to the digital values from START to END. For example, in a case of ST=0 and EN=255, the average AV is calculated on the pixels of the values from "0" to "255" (namely all the pixels in this case), and, in a case of ST=0 and EN=177, the calculation is made on the pixels of the values from "0" to "177".

Then a step S54 calculates a skew value SK of the pixels corresponding to the luminance values from START to END. The skew is a statistical amount representing the deviation of the distribution of the histogram, and is calculated by the following equation (1):

$$SK = (\Sigma(Xi - AV)^3)/D \qquad (1)$$

wherein R^3 indicates a third power of R, X indicates the luminance of each pixel, and D is the dispersion of the entered image, calculated by the equation (2):

$$D = \Sigma(Xi - AV)^2 \qquad (2)$$

wherein R^2 indicates a square of R.

Subsequent steps S55 and S56 judge the direction of deviation of the histogram. The step S55 judges the direction of deviation of the histogram by the following condition (3):

$$SK < -1.0 \qquad (3)$$

indicating whether the histogram has a deviation to the left.

The sequence proceeds to a step S59 or S56, respectively if the condition (3) is satisfied or not in the step S55. The step S59 sets the average AV as the END, while retaining START unchanged, and the sequence returns to the step S53 for again calculating the average AV from START to END.

On the other hand, the step S56 judges the direction of the deviation of the histogram by the following condition (4):

$$SK > 1.0 \qquad (4)$$

indicating that the histogram has a deviation to the right.

The sequence proceeds to a step S510 or S57, respectively if the condition (4) is satisfied to not in the step S56. The step S510 sets the average AV as the START, while retaining END unchanged, and the sequence returns to the step S53 for again calculating the average AV from START to END.

On the other hand, in case the above-mentioned conditions are both unsatisfied in the steps S55 and S56, the step S57 sets the average AV as a binarization threshold TH1. Then a step S58 effects simple binarization process with the binarization threshold TH1.

In the present embodiment, the binarization process is executed for the luminance hierarchy number "1", in the above-explained manner, in which a binarization threshold suitable for a region of the black characters is selected and a simple binarization process is executed. Stated differently, there is executed binarization suitable for the black character region.

In the following there will be given a more detailed explanation on the determination of the above-mentioned binarization threshold TH1, using the example of the histogram shown in FIG. 13.

FIG. 16 is a chart showing the variation of parameters in the region separation pre-process shown in FIG. 15, on an image having the histogram as shown in FIG. 13. In FIG. 16, the parameters are shown by the numbers of cycles through the steps S53 and S54 in the flow chart shown in FIG. 15.

In the first cycle through the steps S53 and S54, the average AV and the statistical amount SK are calculated respectively as "185" and "−102.5", for START=0 and END=255. As the statistical amount SK is less than "−1.0", the step S59 sets START=0 and END=185.

In the second cycle, the average AV and the statistical amount SK are respectively calculated as "98" and "−14.6" for START=0 and END=185. As the statistical amount SK is again less than "−1.0", the step S59 sets START=0 and END=98.

In the third cycle, the average AV and the statistical amount SK are respectively calculated as "45" and "10.7" for START=0 and END=98. As the statistical amount SK exceeds "1.0", the step S510 sets START=45 and END=98.

In the fourth cycle, the average AV and the statistical amount SK are respectively calculated as "77" and "−8.2" for START=45 and END=98. As the statistical amount SK is less than "−1.0", the step S59 sets START=45 and END=77.

In the fifth cycle, the average AV and the statistical amount SK are respectively calculated as "63" and "−3.0" for START=45 and END=77. As the statistical amount SK is again less than "−1.0", the step S59 sets START=45 and END=63.

In the sixth cycle, the average AV and the statistical amount SK are respectively calculated as "54" and "0.9" for START=45 and END=63. As the statistical amount SK is larger than "−1.0" and smaller than "1.0", the conditions of the steps S55, S56 are not satisfied. Thus the sequence proceeds to the step S57 to set "54" as the binarization threshold TH1, and the step S58 executes the simple binarization with thus binarization threshold TH1.

As explained in the foregoing, the binarization threshold is so determined that the skew converges to a predetermined value.

In the foregoing there has been explained the binarization process for the luminance hierarchy number "1". In the following there will be explained the binarization for the characters of medium luminance, with the luminance hierarchy number "2" with reference again to the flow chart in FIG. 15.

At first the step S51 calculates the histogram of the object image. As the step S36 in FIG. 14 has already deleted the separated region (black character region) with the luminance hierarchy number "1" and the step S37 has set the luminance hierarchy number at "2", the step S51 can calculate the frequency of the luminance values corresponding to the luminance hierarchy number "2", in the pixels of the image other than the already separated regions with the luminance hierarchy number "1".

As a result, the histogram obtained in the step S51 assumes a form as shown in FIG. 17. It is to be noted that FIGS. 13 and 17 have different scales in the ordinate. The steps S52 to S58 are executed in the same manner as in the foregoing case for the luminance hierarchy number "1", but the binarization threshold TH2 determined in these steps is naturally different from the aforementioned binarization threshold TH1.

In the following there will be given a more detailed explanation on the determination of the above-mentioned binarization threshold TH2, using the example of the histogram shown in FIG. 17.

Figures 18, 19:
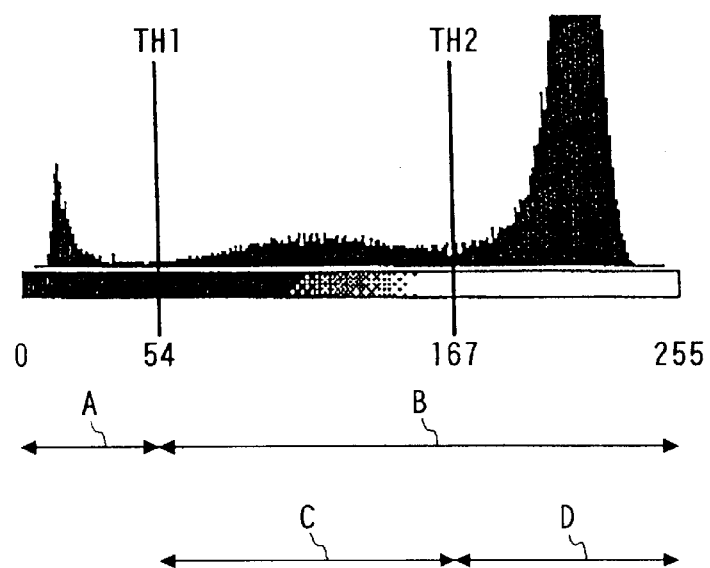
FIG. 18 is a chart showing an example of variables in the region dividing pre-process of the second embodiment.
FIG. 19 is a view showing the result of binarization for each hierarchic luminance level in the region dividing pre-process of the second embodiment.

FIG. 18 is a chart showing the variation of parameters in the region separation pre-process shown in FIG. 18, on an image having the histogram as shown in FIG. 17. In FIG. 18, the parameters are shown by the number of cycles through the steps S53 and S54 in the flow chart shown in FIG. 15.

In the first cycle through the steps S53 and S54, the average AV and the statistical amount SK are respectively calculated as "186" and "−53.4" for START=0 and END= 255. As the statistical amount SK is less than "−1.0", the step S59 sets START=0 and END=186.

In the second cycle, the average AV and the statistical amount SK are respectively calculated as "122" and "4.2" for START=0 and END=255. As the statistical amount SK exceeds "1.0", the step S510 sets START=0 and END=186.

In the third cycle, the average AV and the statistical amount SK are respectively calculated as "149" and "5.8" for START=122 and END=186. As the statistical amount SK exceeds "1.0", the step S510 sets START=149 and END=186.

In the fourth cycle, the average AV and the statistical amount SK are respectively calculated as "167" and "−0.5" for START=149 and END=186. As the statistical amount SK is larger than "−1.0" and smaller than "1.0", the conditions of the steps S55, S56 are not satisfied. Thus the sequence proceeds to the step S57 to set the binarization threshold TH2=167, and the step S58 executes the simple binarization with this binarization threshold TH2.

As explained in the foregoing, the binarization process is conducted for the regions with the luminance hierarchy number "2".

The binarization threshold TH1 for the luminance hierarchy number "1" and the binarization threshold TH2 for the luminance hierarchy number "2" are correlated as shown in FIG. 19. The histogram in FIG. 19 is same as that in FIG. 13, and represents the frequency of luminance of all the pixels. At first there is executed binarization for the luminance hierarchy number "1" with the binarization threshold TH1= 54, thereby separating the "black" region A from the white region B. Then there is executed binarization for the luminance hierarchy number "2" with the binarization threshold TH2=167 on the pixels of the region B after the deletion of the region A, thereby separating a "black" region C from a white region D.

According to the present embodiment, as shown in FIG. 19, all the pixels are separated into three regions, namely a region A with luminances 0–54, a region C with luminances 54–167 and a region D with luminances 167–255.

Figure 14:
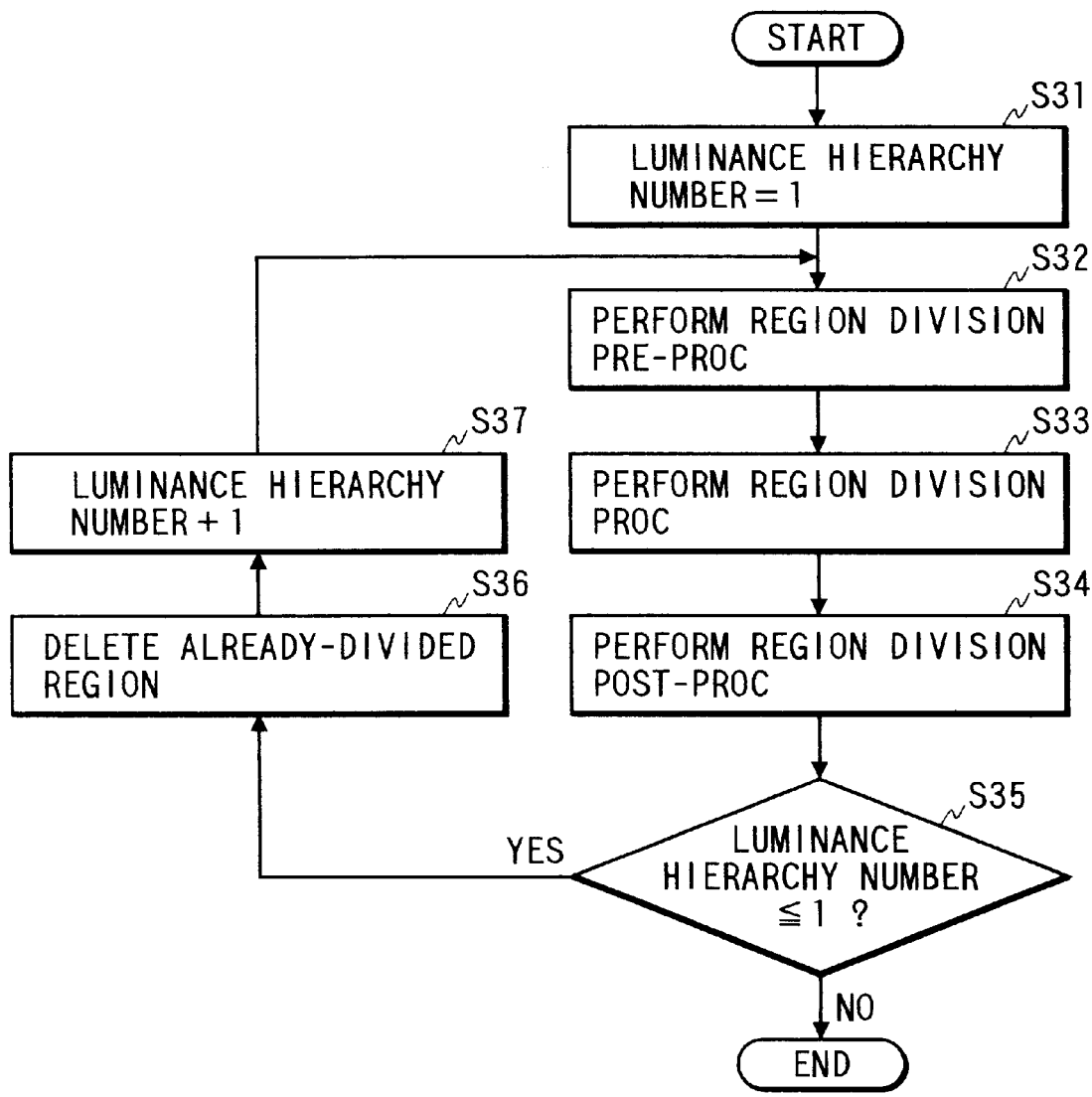
FIG. 14 is a flow chart showing a region dividing process for each hierarchic luminance level in the second embodiment.

The region separating process of the step S33 in FIG. 14 is same as that of the first embodiment shown in FIGS. 6 and 7, and will not, therefor, be explained further.

Also the region separation post-process of the step S34 in FIG. 14 is to eliminate, among the separated regions, a region constituting an error in the separation, and is same as the layout noise reduction (LNR) of the step S504 of the first embodiment in FIG. 2, and the content of this process is same as already explained in relation to FIGS. 8 to 12.

[Image process by luminance hierarchy]

Figure 20:
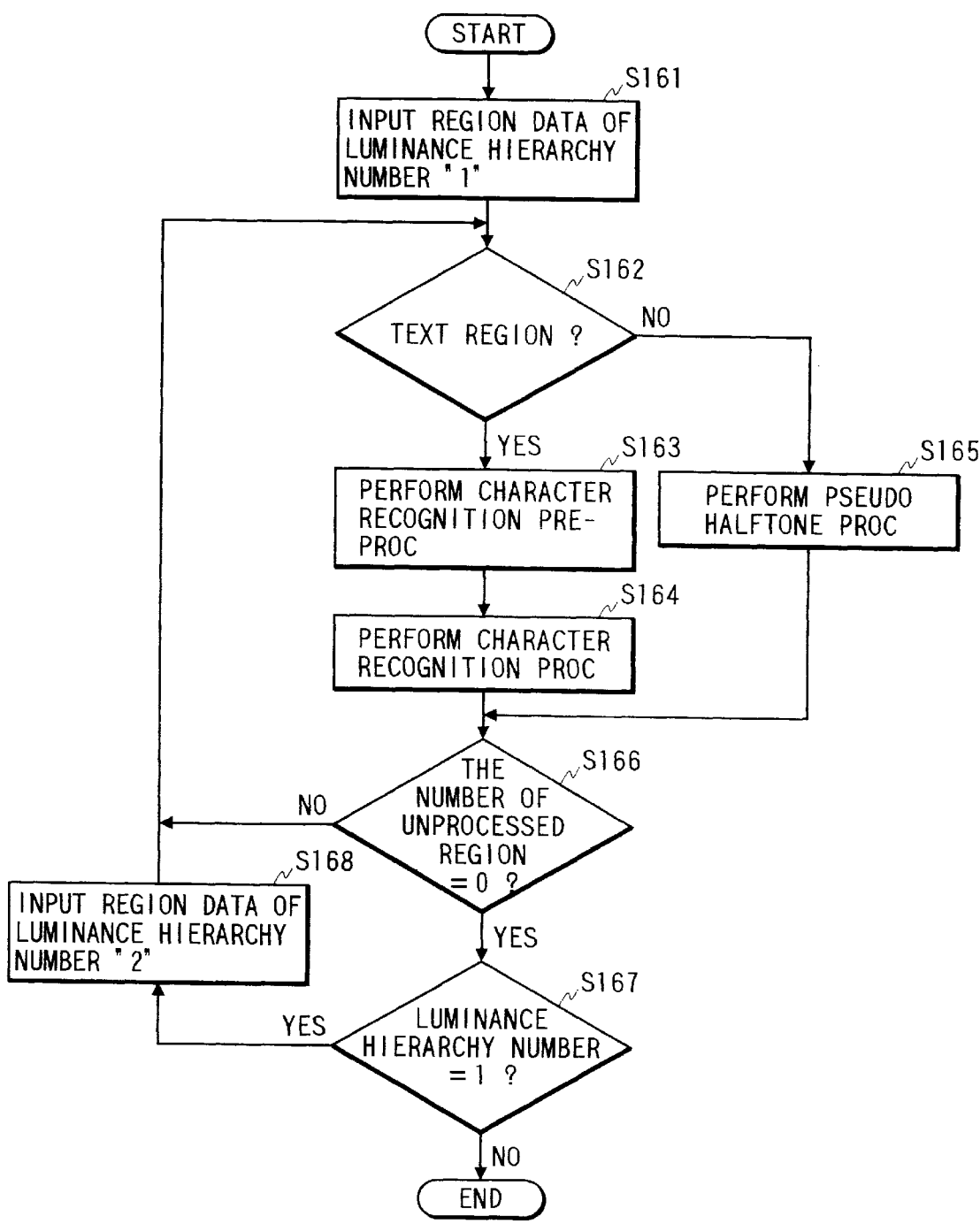
FIG. 20 is a flow chart showing an image processing for each hierarchic luminance level in the second embodiment.

In the following there will be explained the details of the image process by luminance hierarchy in the step S24 in FIG. 12, with reference to a flow chart in FIG. 20.

At first a step S161 reads the regional data for the luminance hierarchy number "1", deleted from the input image in the step S36 in FIG. 14 and stored in the memory unit 5. Then a step S162 discriminates whether the region is a character region, by the attribute of the regional data. In case of a character region, the sequence proceeds to a step S163 to effect simple binarization with a threshold optimum for the text recognition by the OCR, as will be explained later in more details, and then a step S164 effects the OCR process. If not a character region, the region is regarded as an image region and is binarized in a step S165 by a pseudo halftone process such as the error dispersion method or the dither method.

Then a step S166 discriminates whether there still remains an unprocessed region, and the sequence proceeds to a step S162 or S167 respectively if such unprocessed region remains or not. The step S167 discriminates whether the regional data in process have a luminance hierarchy number "1", and, if "1", the sequence proceeds to a step S168, but, if not, the image process by luminance hierarchy is terminated. The step S168 reads the regional data for the luminance hierarchy number "2" and the sequence returns to the step S162.

As explained in the foregoing, the present embodiment effects character recognition for each character region, in each hierarchic luminance level.

[Character recognition pre-process]

Figure 21:
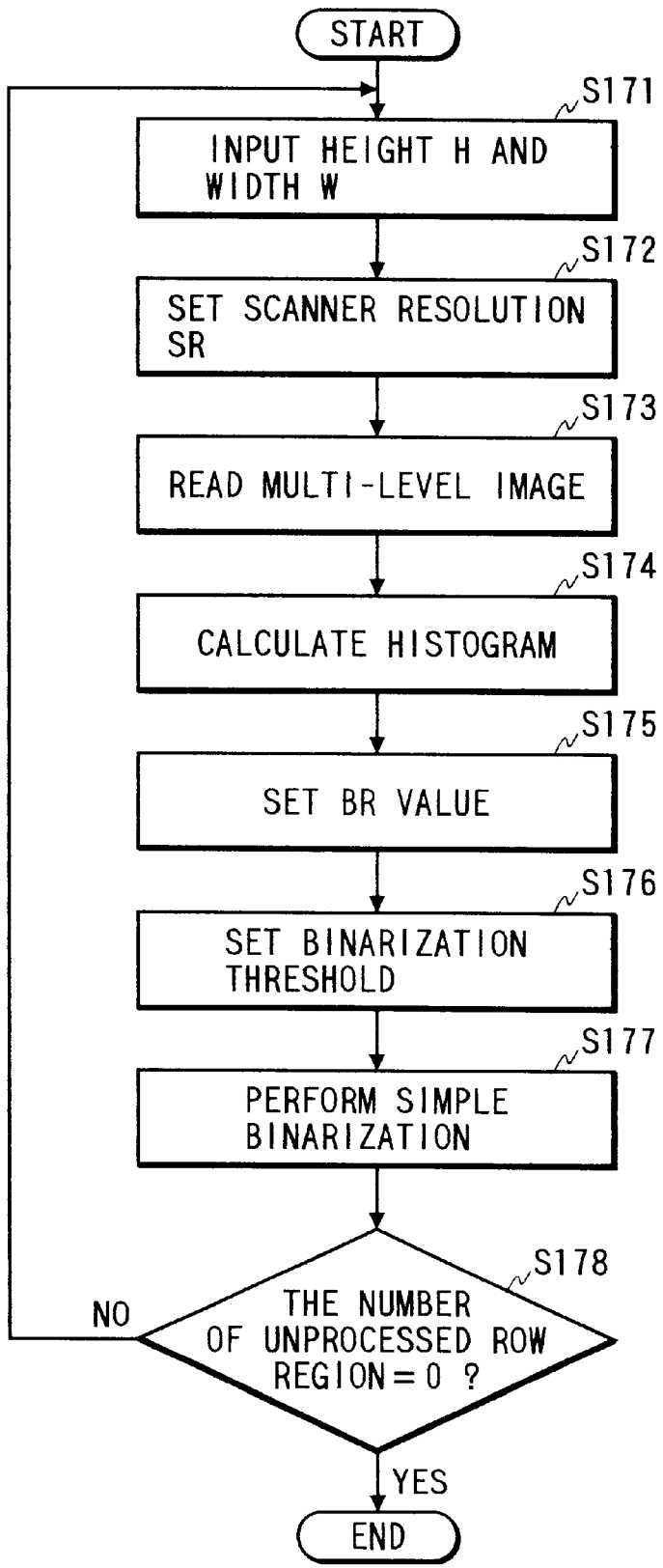
FIG. 21 is a flow chart showing a character recognition pre-process in the second embodiment.

In the following there will be explained the details of the character recognition pre-process of the step S163 in FIG. 20, with reference to a flow chart in FIG. 21, which best represents the features of the binarization constituting the character recognition pre-process.

At first a step S171 reads the height H and the width W from the regional data in a line region in the character region. Then a step S172 sets the resolution SR of the image input device 2 such as the scanner, and a step S173 reads the 8-bit multi-level image of the line region to be processed, into the work memory. Then a step S174 calculates the histogram (frequency of the digital values "0" to "255") of the processed line region, and a step S175 reads a black ratio BR, predetermined according to the relation between the height H of the line region and the resolution SR of the image input device 2. The black ratio BR, to be explained later in more details, is determined as mentioned already in case of a vertically written text, but, in case of a horizontally written text, it is determined according to the relation between the width W of the character region and the resolution SR.

A subsequent step S176 determines a binarization threshold, based on the BR, as will be explained later in more details, and a step S177 effects simple binarization with the threshold determined in the step S176. Finally a step S178 discriminates whether any unprocessed line region still remains, and, the above-explained process is repeated until all the line regions in the character region are binarized.

Now the black ratio BR, determined by the relation of the height H of the line region and the resolution SR of the image input device 2, will be explained in more details, with reference to FIG. 21.

As shown in FIG. 22, the BR is set for each point size of the character. The point size of the character is calculated by:

$$P=(72.0/SR) \times H \qquad (8)$$

As will be understood from the equation (8), the point size P of a character in the object line region can be calculated from the height H of the line region and the resolution SR. Thus the black ratio BR for the line region, enabling best recognition of the characters of each point size, is experimentally determined as shown in FIG. 22. As an example, for a height "56" of the line region and for an input resolution of 400 dpi, the point size of the character in this line region is calculated as "10" points. In this case the BR is selected as "14", based on an experimental result that the character recognition rate becomes highest for the characters of 10 points when the black ratio in the region is 14%.

In this manner, as the character recognition pre-process is executed independently for a region with the luminance hierarchy number "1" and for a region with the luminance hierarchy number "2", there can be achieved secure character recognition after appropriate binarization according to the respective histogram.

In the following there will be explained a specific example, in the image processing apparatus 2 of the present embodiment, of entering an image, including a text, from the image input device 2 and displaying it on the image display device 3. As an example of the original image, there is taken a character region containing characters "文字" in gothic style.

Figure 24A:
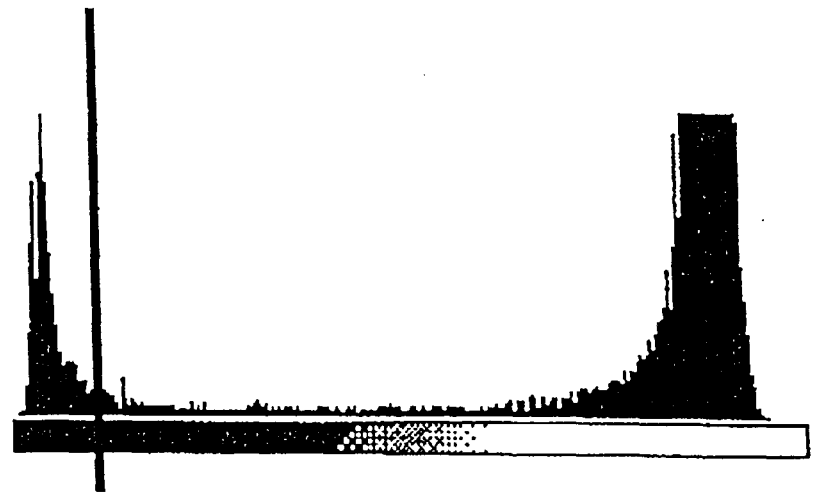
FIGS. 24A and 24B are views showing examples of histogram of the multi-level input image in the second embodiment.
Figure 24B:
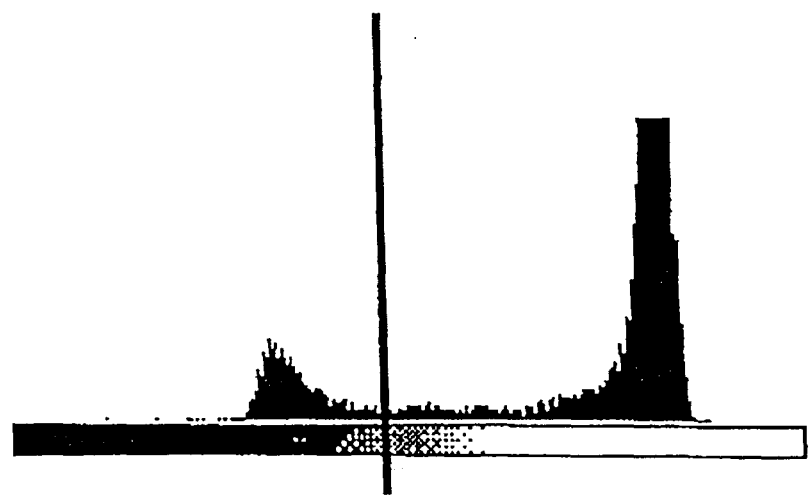
Figure 25A:
FIGS. 25A and 25B are views showing examples of the image binarized from the multi-level input image in the second embodiment.
Figure 25B:

At first the above-mentioned original image is entered from the image input device 2. FIG. 23A shows a case of black characters on a nearly white background, while FIG. 23B shows a case of gray characters. It is assumed that the line region has a height H of "34" and that the image input device 2 has an input resolution of 400 dpi. As the characters are of "6" points from the equation (8), the BR is given as "13" from FIG. 22. These images respectively provide histograms shown in FIGS. 24A and 24B, and the thresholds providing a black ratio of 13% are respectively "29" and "123". Binarization of the images FIGS. 23A and 23B with these thresholds provides images in FIGS. 25A and 25B, which indicate that both the black and gray characters can be appropriately binarized.

As explained in the foregoing, the appropriate determination of the binarization threshold, so as to match the OCR process, enables binarization without deterioration of the multi-level image in the line region. Consequently there can be achieved an improvement in the recognition rate in the character recognition process.

As explained in the foregoing, the present second embodiment enables character recognition in more exact manner, as it can achieve highly precise binarization for gray characters even in processing an image mixedly containing three or more luminance levels (white, gray and black).

The foregoing second embodiment employs three hierarchic luminance levels, but the present invention is not limited to such embodiment and the number of the luminance levels can be determined according to the actual image.

In the foregoing second embodiment, the input image is assumed to be composed of 8-bit multi-level data, but the present invention is not limited to such case and is applicable to any image information containing plural bits for binarization, such as a color image.

Also the sampling of the image for histogram calculation may be made on every pixel or a pixel on every several pixels. Also the calculation of the average AV or the statistical amount SK need not necessarily be conducted with 8 bits but can instead be conducted with a fewer number of bits for the purpose of achieving a higher speed or reducing the memory capacity.

Also the statistical skew amount SK is defined by a converging condition of ±1.0, but such condition is not limitative and there may be adopted any configuration for determining the binarization thresholds by the skew SK.

Also in the foregoing explanation of the second embodiment, the black ratio BR has been explained in case of gothic style, but other character styles can naturally be processed in a similar manner. Also the BR may be altered according to the character style.

Also in the foregoing second embodiment, the black ratios BR are set in advance in a table and the BR value for each character region is selected according to the height of the character region and the resolution of the image input device, but the BR value may be arbitrarily set by the operator for each character region. Stated differently, the BR value may be determined by any suitable means.

Furthermore, in the foregoing second embodiment, the threshold is determined for each line region in the character region, but the threshold setting method is not limited to such example. For example, certain limitation may be applied to the threshold, in such a manner that the thresholds in a same character region do not differ significantly, by considering other thresholds in the same character region.

It is also possible to effect the character recognition by distinguishing the gray character region and the black character region, by including the luminance hierarchy information in the regional data.

As explained in the foregoing, the second embodiment enables highly precise binarization for each luminance level even in processing an image mixedly containing three or more luminance levels, by executing binarization with a binarization threshold calculated for each hierarchic luminance level and then region for each hierarchic luminance level, whereby exact region separation can be achieved over plural luminance levels.

It is also possible to effect the character recognition by distinguishing the gray character region and the black character region, as each region can be distinguished in plural hierarchic luminance levels.

Furthermore, as explained in the foregoing, the second embodiment enables character recognition in more precise manner as highly precise binarization for each luminance level is possible even in processing an image mixedly containing three or more luminance levels, by executing binarization with a first binarization threshold calculated for a hierarchic luminance level, followed by region separation, then executing binarization with a second binarization threshold for the regions excluding the already separated region, and effecting the character recognition on thus binarized character region, whereby attained is an improvement in the recognition rate for example of the gray characters.

It is also possible to effect the character recognition by distinguishing the gray character region and the black character region, as each region can be distinguished in plural hierarchic luminance levels.

The present invention is applicable not only to a system composed of plural equipment such as an image scanner, a printer controller, a printer etc., but also to an apparatus consisting of a single equipment such as a color copying machine. Also the present invention is not limited to the hardwares in the image processing apparatus as in the foregoing embodiments, but is applicable also to a case where the present invention is achieved by the supply of a program stored in a suitable medium such as magnetic disk to a system or an apparatus.

The present invention has been explained by preferred embodiments thereof, but the present invention is not limited to such embodiments and is subject to various modifications within the scope and spirit of the appended claims.

What is claimed is:

1. An image processing method comprising the steps of:

calculating frequencies of different levels of a multi-level image;

specifying a region of said frequencies of the different levels, based on the average and the deviation of said frequencies of the different levels; and taking the average of said specified region as a binarization threshold, wherein said specified region of said frequencies of the difference levels is determined by gradually narrowing a region of said frequencies of the different levels in said multi-level image, until the deviation in said region of the frequencies of the different levels remains within a predetermined range.

2. An image processing method according to claim 1, further comprising a step of binarizing said multi-level image with said binarization threshold.

3. An image processing method according to claim 1, wherein said deviation is calculated from the difference between the level of each pixel and the average of said frequencies of the different levels.

4. An image processing method according to claim 1, wherein said deviation is calculated from an odd-numbered power of the difference between the level of each pixel and the average of said frequencies of the different levels.

5. An image processing method according to claim 1, wherein, if said deviation is outside said predetermined range and positive, said region of the frequencies of the different levels is selected from a start point at the average of said frequencies of the different levels to an end point at the maximum value of said frequencies of the different levels, and, if said deviation is outside said predetermined range and negative, said region of the frequencies of the different levels is selected from a start point at the minimum value of said frequencies of the different levels to an end point at the average of said frequencies of the different levels.

6. An image processing apparatus comprising:

calculating means for calculating frequencies of different levels of a multi-level image;

specifying means for specifying a region of said frequencies of the different levels, based on the average and the deviation of said frequencies of the different levels; and threshold setting means for taking the average of said specified region as a binarization threshold, wherein said specifying means is adapted to specify a region of said frequencies of the different levels in said multi-level image by gradually narrowing said region of said frequencies of the different levels, until the deviation in said region of the frequencies of the different levels remains within a predetermined range.

7. An image processing apparatus according to claim 6, further comprising:

input means for entering said multi-level image; and binarization means for binarizing said multi-level image with said binarization threshold.

8. An image processing apparatus according to claim 6, wherein said specifying means is adapted, if said deviation is outside predetermined range and positive, to select said region of the frequencies of the different levels from a start point at the average of said frequencies of the different levels to an end point at the maximum value of said frequencies of the different levels, and, if said deviation is outside said predetermined range and negative, to select said region of the frequencies of the different levels from a start point at the minimum value of said frequencies of the different levels to an end point at the average of said frequencies of the different levels.

9. An image processing apparatus comprising:

threshold setting means for setting binarization thresholds according to the levels of the luminance hierarchy of an input image;

binarization means for binarizing said input image with said binarization thresholds according to the luminance hierarchy set by said threshold setting means, thereby generating binary images according to the luminance hierarchy;

region separating means for separating regions in said binary images; and accumulation means for accumulating the frequency of the luminance of the input image, wherein said threshold setting means is adapted to set the binarization thresholds according to the result of the accumulation of the frequency of the luminance by said accumulation means, and wherein said threshold setting means is adapted to specify a region where the accumulated frequency of the luminance by said accumulation means becomes minimum and to take the average luminance in said region as the binarization threshold.

10. An image processing apparatus according to claim 9, wherein said binarization means is adapted to effect simple binarization of said input image.

11. An image processing method comprising the steps of:

a threshold setting step of setting binarization thresholds according to the levels of the luminance hierarchy of an input image;

a binarization step of binarizing said input image with the binarization thresholds according to the luminance hierarchy, set by said threshold setting step, thereby generating binary images according to the luminance hierarchy;

a region separating step of separating regions in said binary images according to the luminance hierarchy; and an accumulation step for accumulating the frequency of the luminance of the input image, wherein said threshold setting step is adapted to set the binarization thresholds according to the result of accumulation of the frequency of the luminance by said accumulation step, and wherein said threshold setting step is adapted to specify a region where the accumulated frequency of the luminance by said accumulation step becomes minimum and to take the average luminance in said region as the binarization threshold.

12. An image processing method according to claim 11, wherein said binarization step is adapted to effect simple binarization of said input image.

13. An image processing method comprising:

a first threshold setting step of setting a binarization threshold for a first input image;

a first binarization step of binarizing said first input image with the binarization threshold set by said first threshold setting step, thereby generating a first binary image;

a first region separating step of separating a region from said first binary image;

a second image generating step of deleting a predetermined region separated from said first input image by said first region separating step, thereby generating a second input image;

a second threshold setting step of setting a binarization threshold for said second input image;

a second binarization step of binarizing said second input image with the binarization threshold set by said second threshold setting step, thereby generating a second binary image; and a second region separating step of separating a region from said second binary image.

14. An image processing method according to claim 13, further comprising:

a first accumulation step of accumulating the frequency of the luminance of said first input image; and a second accumulation step of accumulating the frequency of the luminance of said second input image;

wherein said first threshold setting step is adapted to set the first binarization threshold according to the result of accumulation of the frequency of the luminance by said first accumulation step; and said second threshold setting step is adapted to set the second binarization threshold according to the result of accumulation of the frequency of the luminance by said second accumulation step.

15. An image processing method according to claim 13, further comprising:

a first eliminating step of eliminating an error in the separation of region, from the regions separated by said first region separating step; and a second eliminating step of eliminating an error in the separation of region, from the regions separated by said second region separating step.

16. An image processing method according to claim 13, wherein said first and second binarization steps are adapted to effect simple binarization.

* * * * *